(12) United States Patent
Nagai et al.

(10) Patent No.: US 8,149,091 B2
(45) Date of Patent: Apr. 3, 2012

(54) RADIO-FREQUENCY TAG COMMUNICATION DEVICE, RADIO-FREQUENCY TAG COMMUNICATION SYSTEM, AND RADIO-FREQUENCY TAG DETECTING SYSTEM

(75) Inventors: Takuya Nagai, Nagoya (JP); Yuji Kiyohara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1527 days.

(21) Appl. No.: 11/558,727

(22) Filed: Nov. 10, 2006

(65) Prior Publication Data

US 2007/0120650 A1 May 31, 2007

Related U.S. Application Data

(63) Continuation-in-part of application No. PCT/JP2005/006794, filed on Apr. 6, 2005.

(30) Foreign Application Priority Data

May 13, 2004 (JP) .................................. 2004-143523
Sep. 27, 2004 (JP) .................................. 2004-278715

(51) Int. Cl.
*H04Q 5/22* (2006.01)

(52) U.S. Cl. ...................... 340/10.1; 340/10.2; 340/10.3; 340/10.4; 340/10.5

(58) Field of Classification Search .................... 342/42, 342/44, 51; 235/226; 340/10.1–10.5, 572.1, 340/572.4

See application file for complete search history.

(56) References Cited

U.S. PATENT DOCUMENTS

| 5,340,968 | A | | 8/1994 | Watanabe et al. | |
| 5,351,052 | A | * | 9/1994 | D'Hont et al. ................. | 342/42 |
| 5,557,096 | A | | 9/1996 | Watanabe et al. | |
| 5,565,858 | A | * | 10/1996 | Guthrie ...................... | 340/10.33 |
| 5,648,767 | A | | 7/1997 | O'Connor et al. | |
| 5,701,127 | A | * | 12/1997 | Sharpe .......................... | 340/10.2 |
| 5,708,972 | A | | 1/1998 | Matsumoto | |
| 5,726,630 | A | * | 3/1998 | Marsh et al. ................. | 340/10.2 |

(Continued)

FOREIGN PATENT DOCUMENTS

DE 10028077 A1 12/2001

(Continued)

OTHER PUBLICATIONS

International Preliminary Report on Patentability, mailed Nov. 23, 2006, on Written Opinion of counterpart international application PCT/JP2005/006794.

Japanese Patent Office, Office Action for Japanese Patent Application No. 2004-143523 (counterpart to above-captioned patent application), mailed Sep. 9, 2008.

(Continued)

*Primary Examiner* — Nam V Nguyen
(74) *Attorney, Agent, or Firm* — Baker Botts L.L.P.

(57) ABSTRACT

A radio-frequency tag communication device permitting a radio-frequency tag communication system to have a sufficiently large area of communication, with a minimum required number of interrogators. The radio-frequency tag communication device includes a transmission control portion operable to control transmission of a transmitted signal, so as to prevent overlapping an area of communication of the radio-frequency tag communication device and an area of communication of another radio-frequency tag communication device, making it possible to maximize a spacing distance between the adjacent radio-frequency tag communication devices, and to effectively prevent concurrent receptions of the transmitted signals by the plurality of radio-frequency tags. Namely, the radio-frequency tag communication device permits the radio-frequency tag communication system to have a sufficiently large area of communication with a minimum required number of interrogators.

21 Claims, 24 Drawing Sheets

U.S. PATENT DOCUMENTS

| | | | |
|---|---|---|---|
| 5,952,922 A * | 9/1999 | Shober | 340/572.4 |
| 6,046,683 A | 4/2000 | Pidwerbetsky et al. | |
| 6,064,320 A * | 5/2000 | d'Hont et al. | 340/933 |
| 6,087,986 A | 7/2000 | Shoki et al. | |
| 6,473,055 B2 | 10/2002 | Kohno et al. | |
| 6,522,898 B1 | 2/2003 | Kohno et al. | |
| 6,590,498 B2 * | 7/2003 | Helms | 340/572.7 |
| 7,005,968 B1 * | 2/2006 | Bridgelall | 340/10.42 |
| 7,433,648 B2 * | 10/2008 | Bridgelall | 455/41.2 |

FOREIGN PATENT DOCUMENTS

| | | |
|---|---|---|
| EP | 0837523 A2 | 4/1998 |
| JP | H05-281346 A | 10/1993 |
| JP | H08-223080 A | 8/1996 |
| JP | H08-228167 A | 9/1996 |
| JP | 2001116583 A | 4/2001 |
| JP | 2001-298389 A | 10/2001 |
| JP | 2003-189352 A | 7/2003 |
| JP | 2003283367 A | 10/2003 |
| JP | 2004-064328 A | 2/2004 |
| JP | 2004-112415 A | 4/2004 |

OTHER PUBLICATIONS

Japanese Patent Office, Office Action for Japanese Patent Application No. 2004-278715 (counterpart to above-captioned patent application), mailed Sep. 9, 2008.

European Search Report (EP Appln. No. 05728732—counterpart of above-captioned U.S. patent application) dated May 31, 2007.

Japanese Patent Office, Office Action for Japanese Patent Application No. 2004-143523 (counterpart to above-captioned patent application), mailed Dec. 9, 2008.

European Patent Office, Communication pursuant to Article 94(3) EPC for European Patent Application No. 05728732.8 (counterpart to above-captioned patent application), dated Mar. 24, 2011.

European Patent Office, extended European Search Report for European Patent Application No. 09007340.4 (counterpart to above-captioned patent application), dated Apr. 26, 2011.

Japan Patent Office, International Search Report for International Application No. PCT/JP2005/006794 (counterpart to above-captioned patent application), mailed Jul. 12, 2005.

* cited by examiner

RADIO-FREQUENCY TAG COMMUNICATION DEVICE, RADIO-FREQUENCY TAG COMMUNICATION SYSTEM, AND RADIO-FREQUENCY TAG DETECTING SYSTEM

The present application is a Continuation-in-Part of International Application No. PCT/JP2005/006794 filed Apr. 6, 2005, which claims the benefits of Japanese Patent Applications No. 2004-143523 filed May 13, 2004 and No. 2004-278715 filed Sep. 27, 2004.

BACKGROUND OF THE INVENTION

1. Field of the Invention

The present invention relates to improvements of a radio-frequency tag communication device capable of information writing and reading on and from radio-frequency tags by radio communication, a radio-frequency tag communication system including the radio-frequency tag communication device, and a radio-frequency tag detecting system.

2. Description of the Related Art

There is known an RFID system (radio-frequency identification system) wherein a radio-frequency tag communication device (interrogator) is arranged to effect non-contact information reading from small-sized radio-frequency tags (transponders) in which desired information is stored. In this RFID system, the radio-frequency tag communication device is capable of reading the stored information from the radio-frequency tags by radio communication, even where the radio-frequency tags are soiled or located at invisible places. For this reason, the RFID system is expected to be used in various fields such as commodity management and inspection.

The radio-frequency tag communication device usually has a maximum distance of communication of about several meters. Therefore, the use of a single interrogator as the radio-frequency tag communication device does not permit adequate communication with the radio-frequency tags located in a comparatively large space. In view of this drawback, there have been proposed techniques for enlarging the area of communication of the radio-frequency tag communication device. Patent Document 1 discloses an interrogator system as an example of such techniques. According to this technique, the radio-frequency tag communication device consisting of a plurality of interrogators and a control terminal to control the plurality of interrogators is arranged such that the areas of communications of antennas provided in the respective interrogators overlap each other, to permit radio communication between the plurality of interrogators and the radio-frequency tags, using the same signal, so that the overall area of communication of the radio-frequency tag communication device is enlarged.

There is also proposed a technique that uses a plurality of radio-frequency tag communication devices which cooperate with each other to cover a desired area of communication with the radio-frequency tags. Patent Document 2 discloses a navigation system as an example of this technique. This technique uses a plurality of fixed terminals (stationary radio-frequency tag communication devices) located in a desired chamber or any other desired space, and a portable terminal (portable radio-frequency tag communication device) which is carried by the users, to permit adequate detection of or guiding to a desired destination within a relatively narrow area.

Patent Document 1: JP-2003-283367 A
Patent Document 2: JP-2001-116583 A

However, the former conventional technique described above requires the plurality of interrogators to be located comparatively close to each other so that the areas of communications of the antennas provided in the respective interrogators overlap each other, so that the required number of the interrogators tends to be undesirably increased. Further, so-called "passive tags" not provided with an internal power source are generally unable to effect communication by concurrent reception of signals from the plurality of interrogators, and the passive tags located within mutually overlapping regions of the areas of communication are not able to effect adequate communication with the interrogators. Thus, there has been a need of developing a radio-frequency tag communication system which has a sufficiently large area of communication with a minimum required number of the interrogators. On the other hand, the latter conventional technique described above has a risk of an interference between waves transmitted from the plurality of fixed terminals, which interference has an adverse influence on the information reading from the radio-frequency tags. Thus, there has been a need of developing a radio-frequency tag detecting system capable of accurately detecting the radio-frequency tags within the desired area of communication while effectively preventing the interference of the transmitted waves.

SUMMARY OF THE INVENTION

The present invention was made in view of the background art described above. Accordingly, the present invention has objects to provide a radio-frequency tag communication device, a radio-frequency tag communication system and a radio-frequency tag detecting system, which have a sufficiently large area of communication with a minimum required number of interrogators, and which do not suffer from a mutual interference of transmitted waves.

The first object may be achieved according to a first aspect of this invention, which provides a radio-frequency tag communication device arranged to transmit a transmitted signal toward radio-frequency tags, and to receive reply signals transmitted from the radio-frequency tags in response to the transmitted signals, for communication with the radio-frequency tags, the radio-frequency tag communication device being characterized by comprising a transmission control portion operable to control transmission of the transmitted signal, so as to prevent overlapping of an area of communication of the radio-frequency tag communication device and an area of transmission of another radio-frequency tag communication device.

The second object may be achieved according to a second aspect of this invention, which provides a radio-frequency tag communication system comprising a plurality of radio-frequency tag communication devices 12 each constructed according to the above-described first aspect of the invention, and wherein the transmission control portions of the plurality of radio-frequency tag communication devices transmit the transmitted signals in synchronization with each other, so as to prevent overlapping areas of communication of said plurality of radio-frequency tag communication devices.

The third object may be achieved according to a third aspect of this invention, which provides a radio-frequency tag detecting system comprising a plurality of stationary radio-frequency tag communication devices which are located at respective predetermined positions and which are arranged to transmit transmitted signals toward a predetermined radio-frequency tag and to receive a reply signal transmitted from the radio-frequency tag, for communication with the radio-frequency tag, and a portable radio-frequency tag communication device which is arranged to transmit a transmitted signal toward the radio-frequency tag and to receive a reply signal transmitted from the radio-frequency tag, for detecting the radio-frequency tag located within areas of communication of the plurality of stationary radio-frequency tag communication devices, the radio-frequency tag detecting system being characterized by further comprising a transmission control portion operable to control transmission of the transmitted signals such that the plurality of stationary radio-frequency tag communication devices and the portable radio-frequency tag communication device transmit the transmitted signals at respective different timings.

According to the first aspect of this invention, the radio-frequency tag communication device comprises the transmission control portion operable to control the transmission of the transmitted signals, so as to prevent overlapping of the areas of communication of the radio-frequency tag communication device in question with another radio-frequency tag communication device, making it possible to maximize a spacing distance between the adjacent radio-frequency tag communication devices, and effectively prevent concurrent reception of the transmitted signals by each radio-frequency tag. Namely, the radio-frequency tag communication device permits a radio-frequency tag communication system to have a sufficiently large area of communication with a minimum required number of interrogators.

Preferably, the transmission control portion controls the transmission of said transmitted signal such that the transmitted signal is transmitted at a timing different from a timing of transmission of the transmitted signal from another radio-frequency tag communication device, making it possible to effectively prevent the radio-frequency tag from concurrently receiving the transmitted signals from the radio-frequency tag communication devices.

Preferably, the radio-frequency tag communication device further comprises a plurality of antenna elements through which the transmitted signal is transmitted, and the transmission control portion controls a direction of transmission of the transmitted signal by controlling a phase of the transmitted signal to be transmitted through each of the plurality of antenna elements, to thereby change the above-indicated. This arrangement effectively presents the radio-frequency tag from concurrently receiving the transmitted signals from the plurality of radio-frequency tag communication devices.

Preferably, the radio-frequency tag communication device further comprises the radio-frequency-tag communication judging portion operable to determine whether there is any radio-frequency tag which exists within the area of communication of the radio-frequency tag communication device in question and which is under communication with any other radio-frequency tag communication device, and the transmission control portion inhibits the transmission of the transmitted signal when an affirmative determination is obtained by the radio-frequency tag communication judging portion. This arrangement prevents transmission of the transmitted signal to the above-indicated radio-frequency tag under communication with the other radio-frequency tag communication device.

Preferably, the transmission control portion controls the direction of transmission of the transmitted signal to change the area of transmission of the radio-frequency tag communication device when the affirmative determination is obtained by the radio-frequency-tag communication judging portion. This arrangement permits not only effectively prevents the transmission of the transmitted signal to the radio-frequency tag under communication with the other radio-frequency tag communication device, but also permits communication in the changed area of communication, so that the plurality of radio-frequency tag communication devices have an enlarged overall area of communication.

Preferably, the radio-frequency tag communication device further comprises a plurality of antenna elements through which the reply signals are received from the radio-frequency tags, and the reception control portion operable to control the direction of reception of the reply signals by controlling the phase of each of the reply signals received through the plurality of antenna elements. This arrangement permits adequate reception of the reply signals from the radio-frequency tags.

Preferably, the reception control portion is operable to control the amplitude of each of the transmitted signals to be transmitted from the plurality of antenna elements, and the reception control portion is operable to control the amplitude of each of the reply signals received through the plurality of antenna elements. This arrangement permits adequate adjustments of the directions of transmission and reception.

Preferably, the area of communication of the radio-frequency tag communication device which is used for the determination by the radio-frequency-tag communication judging portion is determined on the basis of the direction of reception of the reply signals which is controlled by the reception control portion. This arrangement permits adequate adjustment of the area of communication used for the above-indicated determination.

Preferably, the transmission control portion controls the phase of each of the transmitted signals to be transmitted through the plurality of antenna elements such that the direction of transmission of the transmitted signals is coincident with the direction of reception of the reply signals. This arrangement permits efficient communication with the radio-frequency tags. Moreover, since the area of transmission is coincident with the area of reception, it is possible to adequately determine whether any radio-frequency tag under communication with any other radio-frequency tag communication device exists within the area of transmission. Accordingly, it is possible to prevent the transmission of the transmitted signal to this radio-frequency tag under communication with the other radio-frequency tag communication device.

Preferably, the reception control portion controls the phase of each of the reply signals received by the plurality of antenna elements such that the direction of reception of the rely signals is coincident with the direction of transmission of the transmitted signals. This arrangement permits efficient communication with the radio-frequency tags. Moreover, since the area of transmission is coincident with the area of reception, it is possible to adequately determine whether any radio-frequency tag under communication with any other radio-frequency tag communication device exists within the area of transmission. Accordingly, it is possible to prevent the transmission of the transmitted signal to this radio-frequency tag under communication with the other radio-frequency tag communication device.

Preferably, the radio-frequency tag communication device further comprises the radio-frequency-tag-position detecting portion operable to detect the position of the radio-frequency tag existing within the area of communication of the radio-frequency tag communication device. This arrangement permits detection of the desired radio-frequency tag.

According to the second aspect of the invention described above, the transmission control portions 40 of the plurality of radio-frequency tag communication devices transmit the transmitted signals in synchronization with each other, so as to prevent overlapping areas of communication of the plurality of radio-frequency tag communication devices. The present radio-frequency tag communication system has a sufficiently large area of communication with a minimum required number of interrogators.

Preferably, the transmission control portions of the respective radio-frequency tag communication devices control the transmission of the transmitted signals in synchronization with each other, such that the transmitted signals are transmitted by the radio-frequency tag communication devices at respective different timings. This arrangement makes it possible to effectively prevent the radio-frequency tag from concurrently receiving the transmitted signals from the radio-frequency tag communication devices, and adequately prevent an interference between the transmitted signals.

Preferably, the transmission control portions 40 of the plurality of radio-frequency tag communication devices 12 control directions of transmissions of the transmitted signals, in synchronization with each other, making it possible to prevent the radio-frequency tag from concurrently receiving the transmitted signals from the plurality of radio-frequency tag communication devices, and adequately prevent an interference between the transmitted signals.

The radio-frequency tag detecting system constructed according to the third aspect of this invention described above comprises the transmission control portion operable to control transmission of the transmitted signals such that the plurality of stationary radio-frequency tag communication devices and the portable radio-frequency tag communication device transmit the transmitted signals at the respective different timings. This time sharing transmission of the transmitted signals makes it possible to prevent an interference between the transmitted waves transmitted from the plurality of stationary radio-frequency tag communication devices and the transmitted signal transmitted from the portable radio-frequency tag communication device. Namely, the present radio-frequency tag detecting system permits adequate detection of the radio-frequency tag located at a predetermined position, while effectively preventing the interference between the transmitted waves transmitted from the plurality of stationary radio-frequency tag communication devices and the transmitted wave transmitted from the portable radio-frequency tag communication device.

Preferably, the area of communication of said portable radio-frequency tag communication device is narrower than the areas of communication of said plurality of stationary radio-frequency tag communication devices, so that desired radio-frequency tag can be efficiently detected by first obtaining an approximate position of the desired radio-frequency tag by the plurality of stationary radio-frequency tag communication devices, and then obtaining an accurate position of the desired radio-frequency tag by the portable radio-frequency tag communication device.

Preferably, the transmission control portion controls the timings of transmission of the transmitted signals from the plurality of stationary radio-frequency tag communication devices, so as to prevent concurrent transmission of the transmitted signals toward an area in which the areas of transmission of the plurality of radio-frequency tag communication devices overlap each other. This arrangement effectively prevents an interference between the transmitted waves transmitted form the plurality of stationary radio-frequency tag communication devices.

Preferably, the radio-frequency tag detecting system comprises a plurality of portable radio-frequency tag communication devices each arranged as described above. In this case, the positions of a plurality of radio-frequency tags located within a predetermined area can be more adequately detected.

Preferably, the portable radio-frequency tag communication device is provided with an identification tag, which makes it possible to detect the position of the portable radio-frequency tag communication device by the plurality of stationary radio-frequency tag communication devices.

Preferably, the radio-frequency tag detecting system further comprises a judging portion operable to determine whether the identification tag provided on the portable radio-frequency tag communication device and the radio-frequency tag to be detected are located within one of the areas of communication of the plurality of stationary radio-frequency tag communication devices. This arrangement permits detection of a relative position between the portable radio-frequency tag communication device and the radio-frequency tag to be detected.

Preferably, the transmission control portion controls the transmission of the transmitted signal from the portable radio-frequency tag communication device such that the transmitted signal is transmitted only after an affirmative determination is obtained by the judging portion 248. Accordingly, the desired radio-frequency tag can be efficiently detected by first operating the plurality of radio-frequency tag communication devices to obtain an approximate position of the desired radio-frequency tag, and then operating the portable radio-frequency tag communication device to obtain an accurate position of the desired radio-frequency tag.

Preferably, the portable radio-frequency tag communication device includes an input portion for manually designating the radio-frequency tag to be detected. Accordingly, the user is required to operate only the portable radio-frequency tag communication device, to accurately detect the desired radio-frequency tag located within the predetermined area.

Preferably, the portable radio-frequency tag communication device includes a display portion operable to indicate a direction in which the radio-frequency tag to be detected is located. The display portion 160 permits visual detection of the position of the desired radio-frequency tag.

Preferably, the portable radio-frequency tag communication device includes an indicator portion operable to provide a predetermined indication when an affirmative determination is obtained by the judging portion. This indication enables the user to confirm that the radio-frequency tag to be detected is located near the portable radio-frequency tag communication device.

Preferably, the portable radio-frequency tag communication device includes a plurality of antenna elements, and a directivity control portion operable to control directivity of the plurality of antenna elements. The directivity control portion permits effective and accurate detection of the position of the desired radio-frequency tag.

BRIEF DESCRIPTION OF THE DRAWING

The above and other objects, features and industrial significance of this invention will be better understood by reading the following detailed description of preferred embodiments of the invention, when considered in connection with the accompanying drawings in which.

DETAILED DESCRIPTION OF THE PREFERRED EMBODIMENTS

The preferred embodiments of this invention will be described in detail by reference to the accompanying drawings.

Embodiment 1

Figure 1:
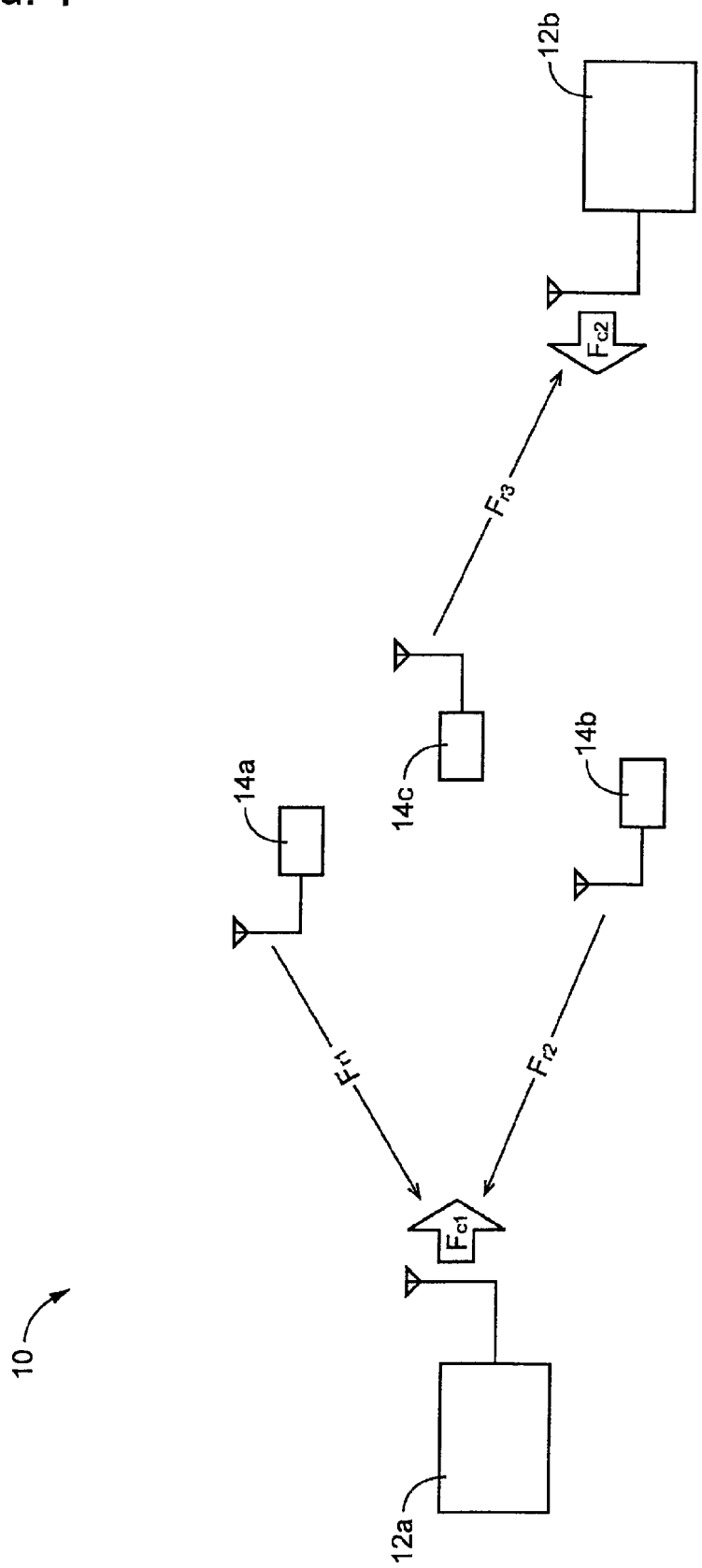
FIG. 1 is a view showing an arrangement of a radio-frequency tag communication system constructed according to one embodiment of a second aspect of the present invention.

Referring to FIG. 1, there is shown an arrangement of a radio-frequency tag communication system 10 (hereinafter referred to simply as "communication system 10") constructed according to one embodiment of the second aspect of this invention. This communication system 10 is a so-called RFID (radio-frequency identification system) which includes at least one radio-frequency tag communication device (two devices in the embodiment as shown in FIG. 1) 12a, 12b (hereinafter referred to simply as "radio-frequency tag communication devices 12", unless otherwise specified) constructed according to one embodiment of the first aspect of this invention, and at least one radio-frequency tag (three tags in the embodiment as shown FIG. 1) 14a, 14b, 14c (hereinafter referred to simply as "radio-frequency tags 14", unless otherwise specified). The radio-frequency tag communication devices 12 function as interrogators of the RFID system, while the radio-frequency tags 14 function as transponders of the RFID system. When transmitted signals in the form of interrogating waves $F_{c1}$, $F_{c2}$ are transmitted from the respective radio-frequency tag communication devices 12a, 12b toward the radio-frequency tags 14a, 14b, 14c, the radio-frequency tags 14a, 14b receiving the interrogating signal $F_{c1}$, for example, modulate the received interrogating signal $F_{c1}$ according to a desired information signal (data), and transmit the modulated signal as respective reply signals in the form of reply waves $F_{r1}$, $F_{r2}$ toward the radio-frequency tag communication device 12a. Thus, radio communication is effected between the radio-frequency tag communication device 12a and the radio-frequency tags 14a, 14b. On the other hand, the radio-frequency tag 12c receiving the interrogating signal $F_{c2}$ modulates the received interrogating signal $F_{c2}$ according to a desired information signal, and transmits the modulated signal as a reply signal in the form of a reply wave $F_{r3}$ toward the radio-frequency tag communication device 12b. Thus radio communication is effected between the radio-frequency tag communication device 12b and the radio-frequency tags 14c.

Figure 2:
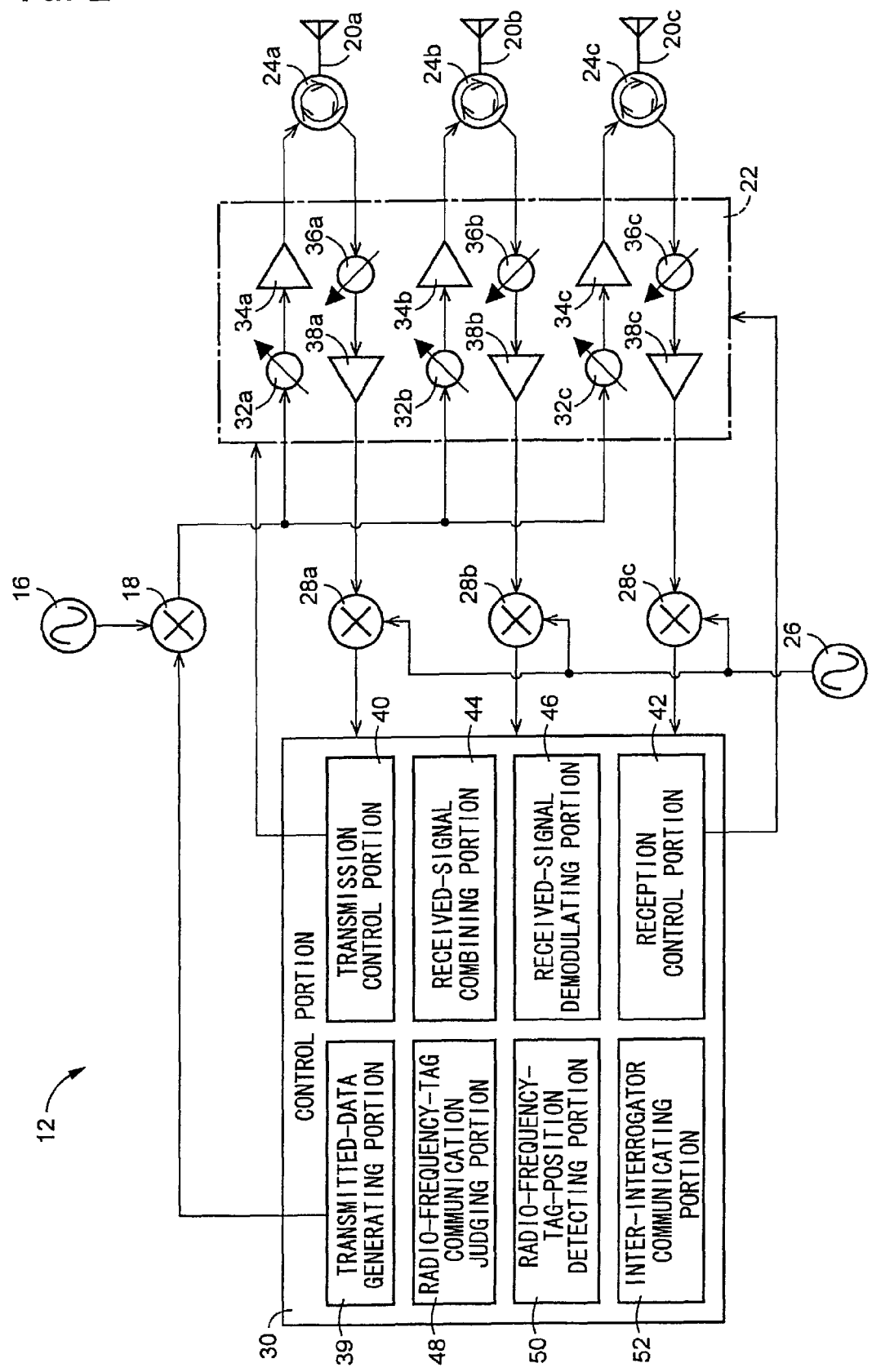
FIG. 2 is a view showing an electrical arrangement of radio-frequency tag communication devices each constructed according to one embodiment of a first aspect of this invention.

Referring to FIG. 2, there is shown an electrical arrangement of each of the radio-frequency tag communication devices 12. As shown in FIG. 2, the radio-frequency tag communication device 12 includes: a main-carrier generating portion operable to generate a main carrier wave of the transmitted signal indicated above; a transmitted-wave generating portion 18 operable to modulate the main carrier wave generated by the main-carrier generating portion 16, according to a transmission information signal (transmitted data) generated by a transmitted-data generating portion 39 (described below), for thereby generating the transmitted signal; a plurality of transmitter/receiver antenna elements (three antenna elements in the embodiment as shown FIG. 2) 20a, 20b, 20c (hereinafter referred to simply as "transmitter/receiver antenna elements 20", unless otherwise specified) operable to transmit the transmitted signals generated by the transmitted-signal generating portion 18, toward the radio-frequency tags 14, and receive the reply signals transmitted from the radio-frequency tags 14 in response to the transmitted signals; a directivity control portion 22 operable to control the directions of transmission of the transmitted signals from the respective transmitter/receiver antenna elements 20, and the directions of reception of the received signals by the transmitter/receiver antennas 20; a plurality of transmission/reception separating portions (three separating portions, in the embodiment as shown FIG. 2) 24a, 24b, 24c (hereinafter referred to simply as "transmission/reception separating portions 24", unless otherwise specified) operable to apply the transmitted signals received from the directivity control portion 22, to the transmitter/receiver antenna elements 20, and to apply the received signals received from the transmitter/receiver antenna elements 20, to the directivity control portion 22; a local-signal generating portion 26 operable to generate a local signal having a predetermined frequency; a plurality of down-converters (three converters in the embodiment as shown FIG. 2) 28a, 28b, 28c operable to reduce the frequencies of the received signals, by multiplying the received signals received from the directivity control portion 22, by the local signal generated by the local-signal generating portion 26; and a control portion 30 operable to effect operations of the radio-frequency tag communication device 12, such as an operation to demodulate the down-converted received signals. The transmission/reception separating portions 24 are preferably constituted by circulators or directional couplers. The directivity control portion 22 includes a plurality of transmitted-signal-phase control portions (three control portions in the embodiment as shown in FIG. 2) 32a, 32b, 32c (hereinafter referred to simply as "transmitted-signal-phase control portions 32", unless otherwise specified) each operable to control the phase of the transmitted signal received from the transmitted-signal generating portion 18, and a plurality of transmitted-signal-amplitude control portions (three control portions in the embodiment as shown in FIG. 2) 34a, 34b, 34c (hereinafter referred to simply as "transmitted-signal-amplitude control portions 34", unless otherwise specified) each operable to control the amplitude of the transmitted signal. The transmitted-signal-phase control portions 32 and the transmitted-signal-amplitude control portions 34 control the directions of transmission of the transmitted signals to be transmitted from the transmitter/receiver antenna elements 20, by controlling the phases and amplitudes of the transmitted signals. The directivity control portion 22 further includes a plurality of received-signal-phase control portions (three control portions in the embodiment as shown in FIG. 2) 36a, 36b, 36c (hereinafter referred to simply as "received-signal-phase control portions 36", unless otherwise specified) each operable to control the phase of the received signal received from the corresponding transmission/reception separating portion 24, and a plurality of received-signal-amplitude control portions (three control portions in the embodiment as shown in FIG. 2) 38a, 38b, 38c (hereinafter referred to simply as "received-signal-amplitude control portions 38", unless otherwise specified) each operable to control the amplitude of the received signal. The received-signal-phase control portions 36 and the received-signal-amplitude control portions 38 control the directions of reception of the received signals by the transmitter/receiver antenna elements 30, by controlling the phases and amplitudes of the received signals.

The control portion 30 indicated above is a so-called microcomputer which incorporates a CPU, a ROM and a RAM and which operates to implement signal processing operations according to programs stored in the ROM, while utilizing a temporary data storage function of the RAM, to generate the above-described transmitted data, to determine the amounts of control by the transmitted-signal-phase control portions 32 and the transmitted-signal-amplitude control portions 34 and the amounts of control by the received-signal-phase control portions 36 and the received-signal-amplitude control portions 38, to control the transmission of the transmitted signals toward the radio-frequency tags 14 and the reception of the received signals from the radio-frequency tags 14 in response to the transmitted signals, to control the demodulation of the received signals, to control the communication with the other radio-frequency tag communication devices 12, and to detect the positions of the radio-frequency tags 14. For effecting those various controls, the control portion 30 includes: the above-indicated transmitted-data generating portion 39; a transmission control portion 40; a reception control portion 42; a received-signal combining portion 44; a received-signal demodulating portion 46; a radio-frequency-tag communication judging portion 48; a radio-frequency-tag-position detecting portion; and an inter-interrogator communicating portion 52.

The transmitted-data generating portion 39 is arranged to generate the transmitted data which is the transmission information signal which is used to generate the transmitted signal and applied to the transmitted-signal generating portion 18. The transmission control portion 40 is arranged to determine the amounts of control by the transmitted-signal-phase control portions 32 and the transmitted-signal-amplitude control portions 34, so as to prevent overlapping of the area of communication of the radio-frequency tag communication device 12 in question and the areas of communication of the other radio-frequency tag communication devices 12. Preferably, the transmission control portion 40 is arranged to minimize the outputs of the transmitted-signal-amplitude control portions 34, for thereby restricting or inhibiting the transmission of the transmitted signals, when an affirmative determination is made by the radio-frequency-tag communication judging portion 48, that is, when it is determined that any radio-frequency tag 14 under communication with any of the other radio-frequency tag communication devices 12 exists in the area of communication of the radio-frequency tag communication device 12 in question. The transmission control portion 40 is also preferably arranged to control the transmission of the transmitted signals so as to prevent overlapping of the areas of communication of the radio-frequency tag communication devices 12, by transmitting the transmitted signals from the radio-frequency tag communication device 12 in question, at a timing different from timings of transmission of the transmitted signals from the other radio-frequency tag communication devices 12. Where the radio-frequency tag communication device 12 in question is the radio-frequency tag communication device 12a, for example, the other radio-frequency tag communication device 12 is the radio-frequency tag communication device 12b, which may be under communication with the radio-frequency tags 14. The area of communication of the radio-frequency tag communication device 12 in question is an area in which the transmitted signals having a sufficiently high intensity can be transmitted to the radio-frequency tags 14 desired to be detected, in other words, an area in which the transmitted signals can be received by the desired radio-frequency tags 14 in such a manner that permits the radio-frequency tags 14 to transmit the reply signals in response to the received transmitted signals.

The transmission control portion 40 is further preferably arranged to control the phases (and amplitudes, if necessary) of the transmitted signals to be transmitted from the transmitter/receiver antenna elements 20, for controlling the directions of transmission of the transmitted signals, to thereby change the area of communication of the radio-frequency tag communication device 12 in question, for preventing overlapping of this area of communication with respect to the areas of communication of the other radio-frequency tag communication devices 12. Namely, the transmission control portion 40 controls the directivity control portion 22 for controlling the phase of each transmitted signal, so that a transmitter antenna device consisting of the transmitter/receiver antenna elements 20 functions as a phased array antenna device. Alternatively, the transmission control portion 40 controls the directivity control portion 22 for controlling the phase and amplitude of each transmitted signal, so as to improve the quality of the transmitted signal, so that the transmitter antenna device consisting of the transmitter/receiver antenna elements 20 functions as an adapted array antenna device. Preferably, the transmission control portion 40 controls the phase and/or the amplitude of the transmitted signals to be transmitted from the plurality of transmitter/receiver antenna elements 20, so that the directions of transmission of the transmitted signals are coincident with the directions of reception of the received signals controlled by the reception control portion 42 as described below. The transmission control portion 40 is further preferably arranged to determine the directions of transmission of the transmitted signals so as to maximize the sum of the received signals combined by the received-signal combining portion 44 as described below.

The reception control portion 42 is arranged to control the phases (and the amplitudes, if necessary) of the received signals received by the corresponding transmitter/receiver antenna elements 20, for thereby controlling the directions of reception of the received signals. Namely, the reception control portion 42 controls the directivity control portion 22 for controlling the phase of each received, so that a receiver antenna device consisting of the transmitter/receiver antenna elements 20 functions as a phased array antenna device. Alternatively, the reception control portion 42 controls the directivity control portion 22 for controlling the phase and amplitude of each received signal, so as to improve the quality of the received signal, so that the receiver antenna device consisting of the transmitter/receiver antenna elements 20 functions as an adapted array antenna device. Preferably, the reception control portion 42 is arranged to determine the directions of reception of the received signals so as to maximize the sum of the received signals combined by the received-signal combining portion 44 as described below.

The received-signal combining portion 44 is arranged to combine together the received signals received through the transmitter/receiver antenna elements 20. The directivity of the receiver antenna device consisting of the transmitter/receiver antenna elements 20 is controlled by the directivity control portion 22 which controls the phases and amplitudes of the received signals under the control of the reception control portion 42 before the received signals are combined together by the received-signal combining portion 44.

The received-signal demodulating portion 46 is arranged to demodulate the received signals which have been received by the plurality of transmitter/receiver antenna elements 20 and which have been combined together by the received-signal combining portion 44. Preferably, the received-signal demodulating portion 46 is arranged to first effect homodyne demodulation of the received signals and then effect FM decoding of the demodulated received signals, for thereby reading the information transmitted as the reply signal from the radio-frequency tag 14.

The radio-frequency-tag communication judging portion 48 is arranged to determine whether there exists any radio-frequency tag 14 which is located within the area of communication of the radio-frequency tag communication device 12 in question and which is under communication with any other radio-frequency tag communication device 12. For example, the radio-frequency-tag communication judging portion 48 determines whether the plurality of transmitter/receiver antenna elements 20 have received the reply signal from any radio-frequency tag 14, which reply signal has been transmitted from that radio-frequency tag 14 in response to the transmitted signal transmitted from any other radio-frequency tag communication device 12. Preferably, the above-indicated area of communication used for the determination by the radio-frequency-tag communication judging portion 48 is determined by the direction of reception of the received signals set by the reception control portion 42.

The radio-frequency-tag-position detecting portion 50 is arranged to detect the position of the radio-frequency tag 14 existing within the above-indicated area of communication. Preferably, the radio-frequency-tag-position detecting portion 50 detects the position of the desired radio-frequency tag 14, on the basis of the direction of reception set by the reception control portion 42 so as to maximize the sum of the received signals combined together by the received-signal combining portion 44, and on the basis of the intensities of the received signals.

The inter-interrogator communicating portion 52 is arranged to effect radio communication with the other radio-frequency tag communication device 12. In the present embodiment, the other radio-frequency tag communication device 12 in question is the communication device 12a, the other radio-frequency tag communication device 12 is the communication device 12b. This other communication device 12b has the same arrangement as the communication device 12a in question, as shown in FIG. 2. For instance, the inter-interrogator communicating portion 52 is arranged to transmit the interrogator number (identification number) of the own radio-frequency tag communication device 12 in question, to the other radio-frequency tag communication device 12, to receive the interrogator number transmitted from the other radio-frequency tag communication device 12, to store in memory the interrogator number in relation to the direction of reception of the interrogator number, to call the other radio-frequency tag communication device 12, or to transmit a reply signal in response to a call from the other radio-frequency tag communication device 12, and to effect a communication control for synchronous communication with the other radio-frequency tag communication device 12. The plurality of radio-frequency tag communication devices 12 included in the communication system 10 effect synchronous communications with each other under the control of the inter-interrogator communicating portion 52. Namely, the transmission control portions 40 of the plurality of radio-frequency tag communication devices 12 control the operations of the communication devices 12 to transmit the transmitted signals in synchronization with each other and independently of each other, so as to prevent overlapping of the areas of communication of the communication devices 12. Preferably, the transmission control portions 40 are arranged to control the operations of the communication devices 12 to transmit the transmitted signals at the different timings, for communication with the radio-frequency tags 14 at different timings, to prevent overlapping of the areas of communications of the individual radio-frequency tag communication devices 12.

Figure 3:
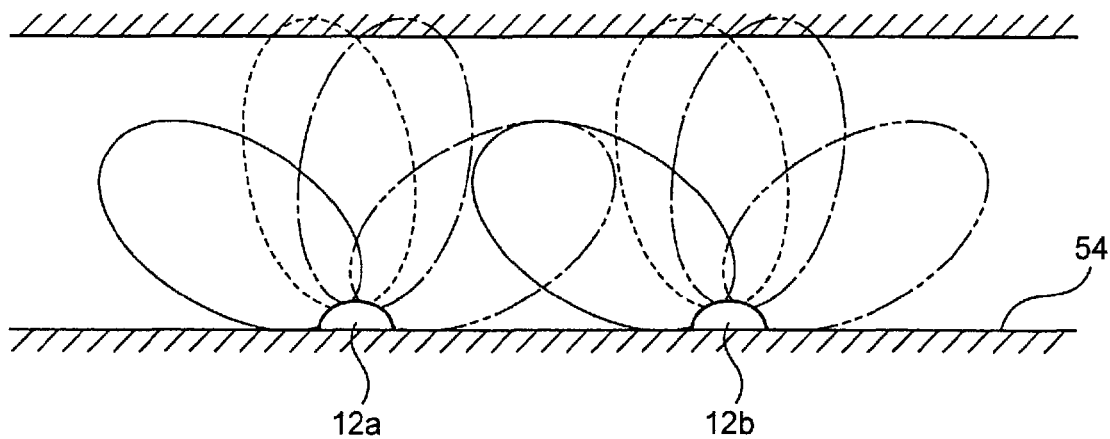
FIG. 3 is a view for explaining an example of a transmission control to set the directions of transmission of transmitted signals from the radio-frequency tag communication devices of FIG. 2 in synchronization with each other.
Figure 4:
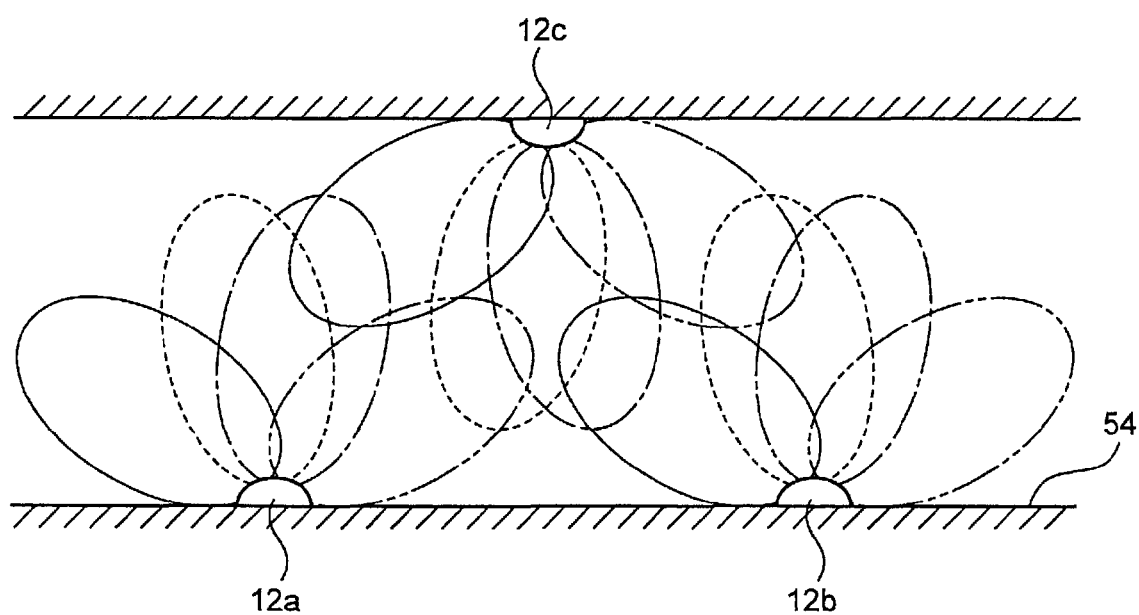
FIG. 4 is a view for explaining another example of the transmission control to set the directions of transmission of the transmitted signals from the radio-frequency tag communication devices of FIG. 2 in synchronization with each other.
Figure 5:
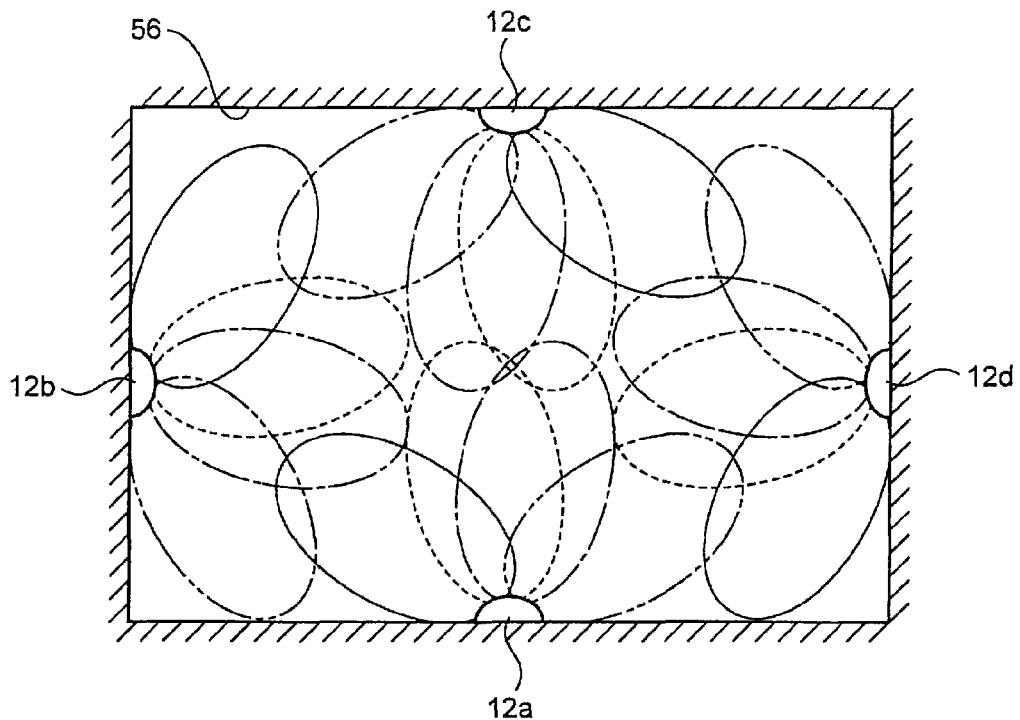
FIG. 5 is a view for explaining a further example of the transmission control to set the directions of transmission of the transmitted signals from the radio-frequency tag communication devices of FIG. 2 in synchronization with each other.

The transmission control portions 40 included in the respective radio-frequency tag communication devices 12 are preferably arranged to change from time to time the directions of transmission of the transmitted signals in synchronization with each other, to prevent the overlapping of the areas of communication of the individual radio-frequency tag communication devices 30. FIG. 3 is a view for explaining an example of the transmission control to set the directions of transmission of transmitted signals from the radio-frequency tag communication devices 12 in synchronization with each other. In the example of FIG. 3, the radio-frequency tag communication devices 12a, 12b are disposed adjacent to each other on one of opposite two wall surfaces which define a passage 54. In FIG. 3, the directions of transmission of the transmitted signals from these radio-frequency tag communication devices 12a, 12b at a timing $T_1$ are indicated by solid lines, and the directions of transmission of the transmitted signals at a timing $T_2$ are indicated by broken lines. Further, the directions of transmission of the transmitted signals at a timing $T_3$ are indicated by one-dot chain lines, and the directions of transmission of the transmitted signals at a timing $T_4$ are indicated by two-dot chain lines. Thus, the directions of transmission of the transmitted signals from the radio-frequency tag communication devices 12 disposed adjacent to each other are changed from time to time in the same direction in synchronization with each other, like a pair of wipers pivoted in the same direction in synchronization with each other, thereby making it possible to prevent the overlapping of the areas of communication of the individual radio-frequency tag communication devices 12. In an alternative example of FIG. 4, another radio-frequency tag communication device 12c is disposed on the wall surface of the passage 54 opposite to the wall surface on which the radio-frequency tag communication devices 12a, 12b. In this example, too, the directions of transmission of the transmitted signals from the radio-frequency tag communication devices 12a, 12b, 12c are changed in synchronization with each other, making it possible to prevent the overlapping of the areas of communication of the individual radio-frequency tag communication devices 12a, 12b, 12c. In a further alternative example of FIG. 5, four radio-frequency tag communication devices 12a, 12b, 12c, 12d are disposed on respective four wall surfaces which define a chamber 56. In this example, too, the directions of transmission of the transmitted signals from the four radio-frequency tag communication devices 12a, 12b, 12c, 12d are changed in synchronization with each other, making it possible to prevent the overlapping of the areas of communication of the individual radio-frequency tag communication devices 12a, 12b, 12c, 12d. Each of the radio-frequency tag communication devices 12c and 12d is identical in construction with the radio-frequency tag communication device 12 shown in FIG. 2.

Figure 6:
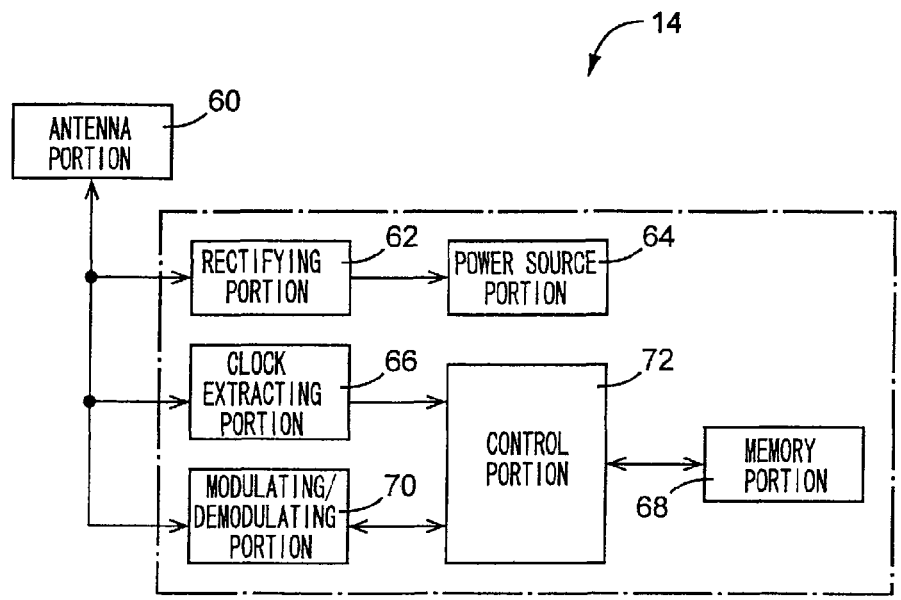
FIG. 6 is a block diagram showing a radio-frequency tag circuit included in each radio-frequency tag shown in FIG. 1.

Referring to FIG. 6, there is shown an arrangement of each radio-frequency tag 14. As shown in FIG. 6, the radio-frequency tag 14 includes: an antenna portion 60 operable to transmit and receive signals to and from the antenna device consisting of the plurality of transmitter/receiver antenna elements 20 of each of the radio-frequency tag communication devices 12 (interrogators); a rectifying portion 62 operable to rectify the carrier wave received by the antenna portion 60; a power source portion 64 operable to store an energy of the carrier wave rectified by the rectifying portion 62; a clock extracting portion 66 operable to extract a clock signal from the carrier wave received by the antenna portion 60, and to apply the extracted clock signal to a control portion 72; a memory portion 68 functioning as an information storage portion operable to store a desired information signal; a modulating/demodulating portion 70 connected to the antenna portion 60 and operable to perform signal modulating and demodulating operations; and the above-indicated control portion 72 operable to control the operations of the radio-frequency tag 14 via the rectifying portion 62, clock extracting portion 66, modulating/demodulating portion 70, etc. The control portion 72 performs basic control operations such as a control operation to store the desired information in the memory portion 68 during communication with the radio-frequency tag communication devices 12, and a control operation to control the modulating/demodulating portion 70 to modulate the carrier wave received through the antenna portion 60, according to information stored in the memory portion 68, and to transmit the modulated carrier wave as the reflected wave through the antenna portion 60. Preferably, the antenna portion 60 is a half-wave dipole antenna consisting of a pair of linear elements.

Referring to the flow charts of FIGS. 7-11, there are illustrated control routines executed by the control portion 30 of each radio-frequency tag communication device 12 for communication with the radio-frequency tags 14 and for mutual communication with the other radio-frequency tag communication devices 12. The control routines are repeatedly executed with a predetermined cycle time. The communication of teach radio-frequency tag communication device 12 with the radio-frequency tags 14, and the mutual communication between the radio-frequency tag communication devices 12 will be described by reference to the flow charts.

Figure 7:
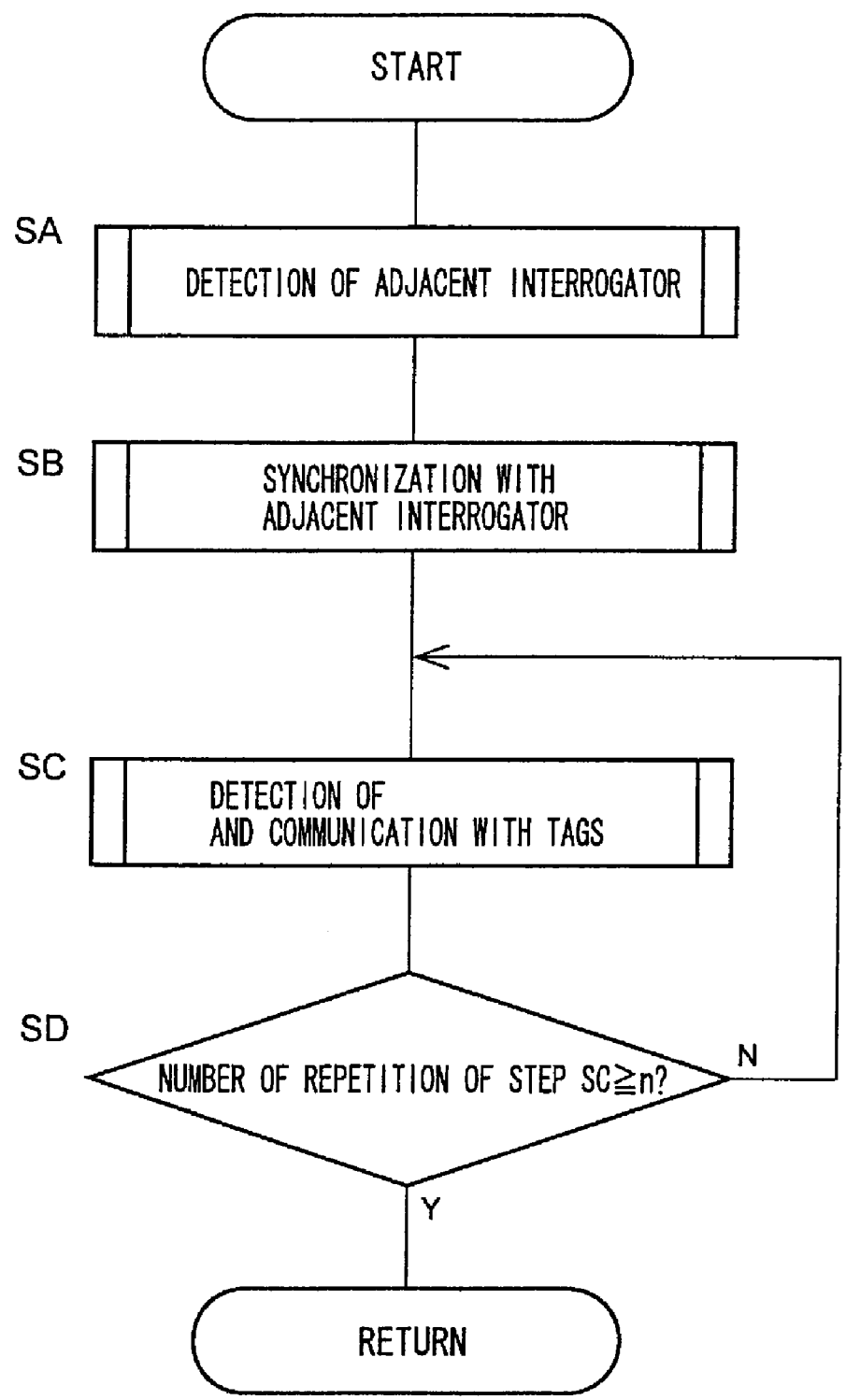
FIG. 7 is a flow chart illustrating control operations of a control portion of each radio-frequency tag communication device of FIG. 2 for communication with radio-frequency tags and for mutual communication with the other radio-frequency tag communication device.
Figure 8:
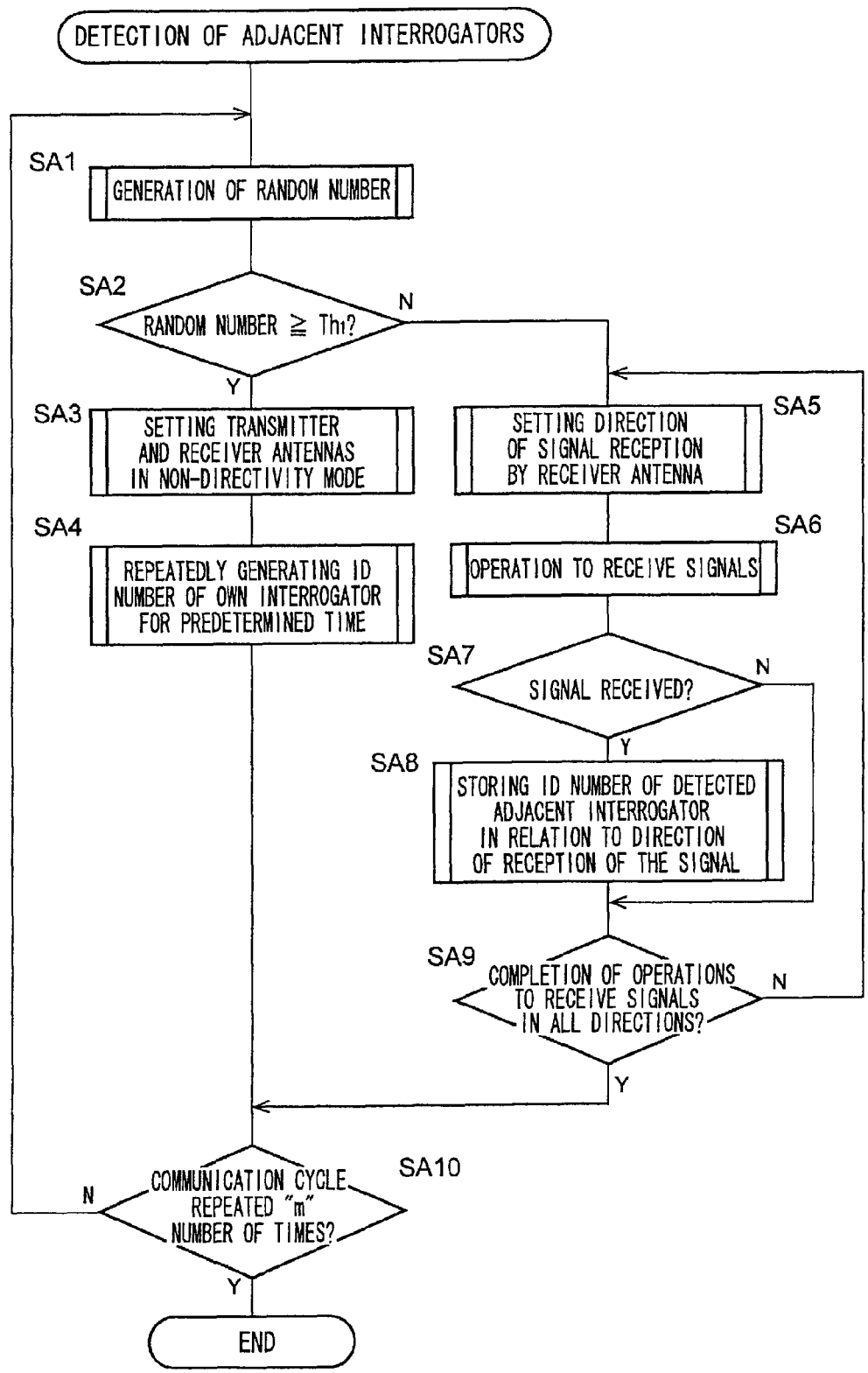
FIG. 8 is a flow chart illustrating the control operation of the control portion illustrated in FIG. 7, for detecting the adjacent radio-frequency tag communication devices.
Figure 9:
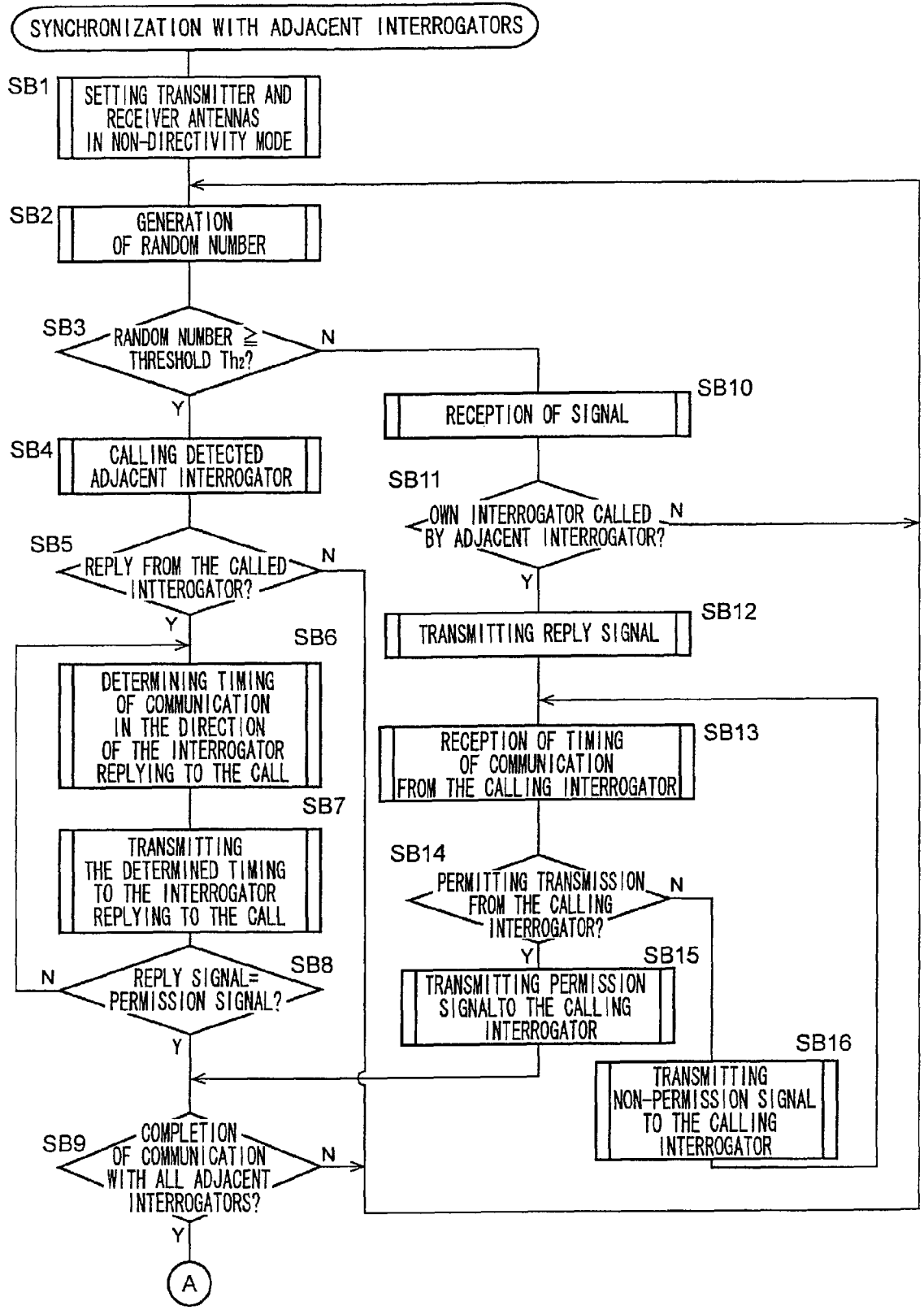
FIG. 9 is a part of the flow chart illustrating of the control operations of the control portion illustrated in FIG. 7, for synchronization with the adjacent radio-frequency tag communication devices.
Figure 10:
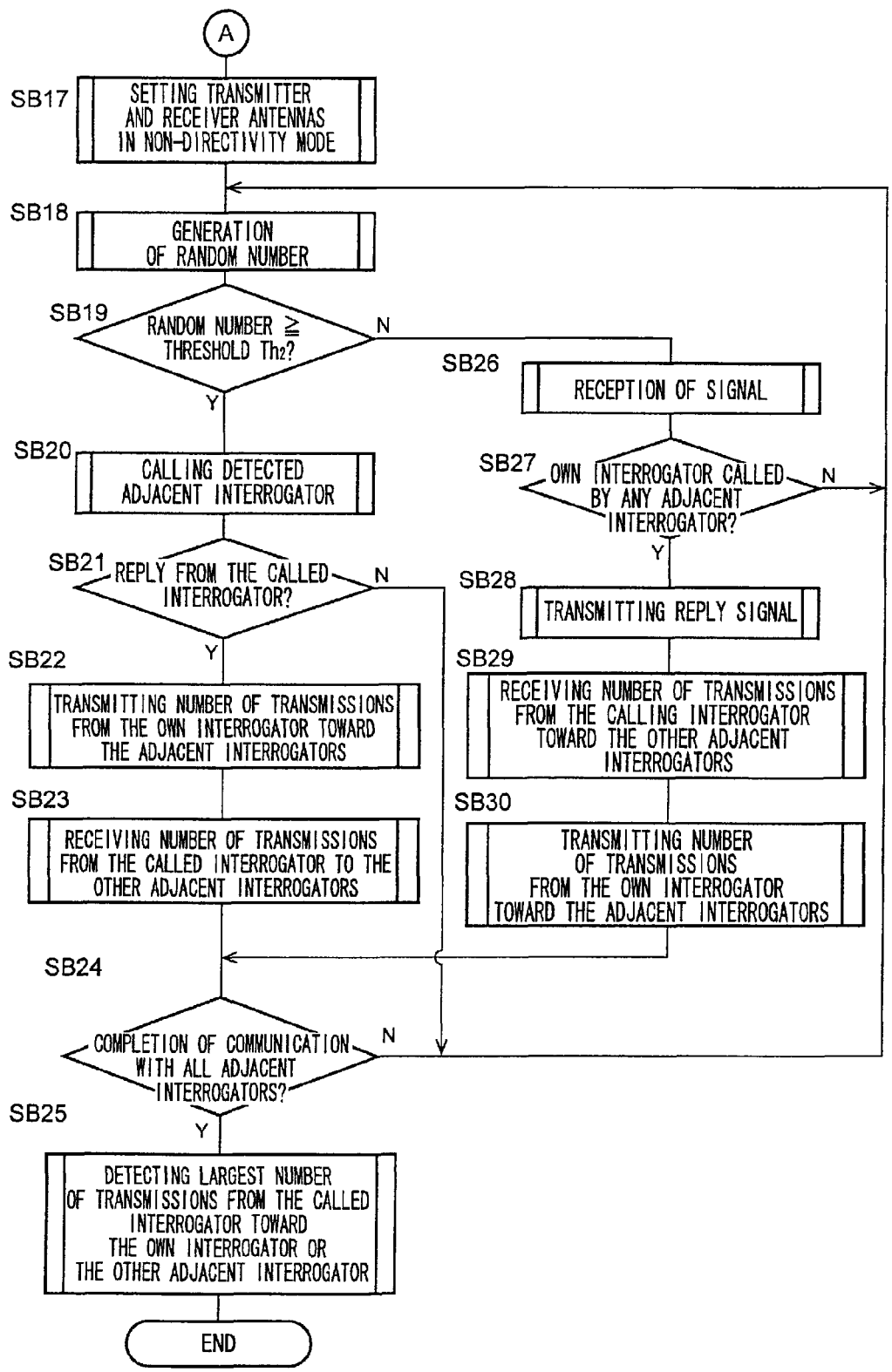
FIG. 10 is another part of the flow chart illustrating the same control operation of the control portion illustrated in FIG. 7, for synchronization with the adjacent radio-frequency tag communication devices.
Figure 11:
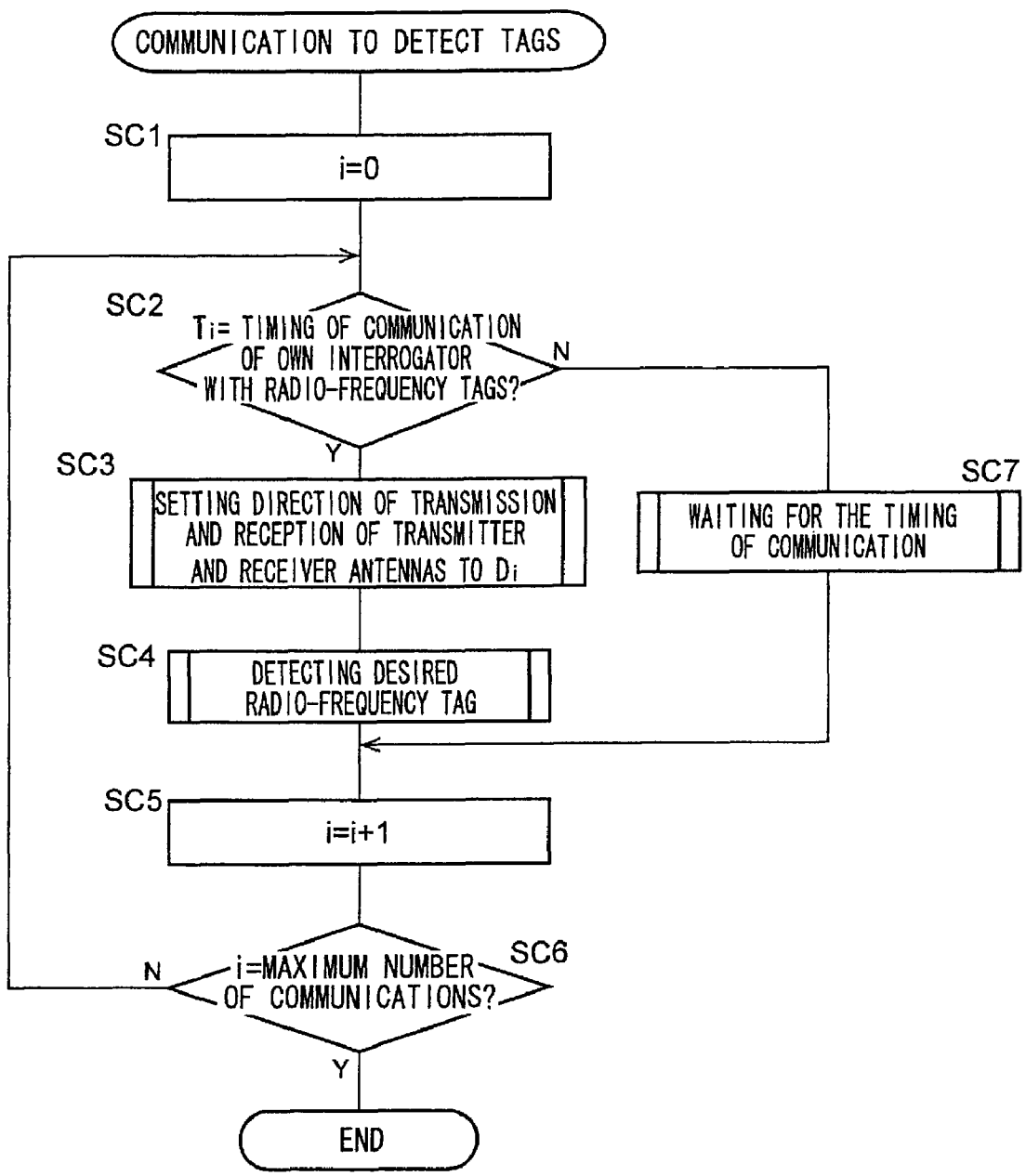
FIG. 11 is a flow chart illustrating the control operation of the control portion illustrated in FIG. 7, for communication to detect the desired radio-frequency tag.

Referring first to FIG. 7, step SA ("step" being hereinafter omitted) is initially implemented to effect a control to detect the adjacent radio-frequency tag communication devices 12 (interrogators), as illustrated in FIG. 8. Then, the control flow goes to SB to effect a control for synchronization with the adjacent radio-frequency tag communication devices 12, as shown in FIGS. 9 and 10. Then, SC is implemented to effect a control for communication to detect the radio-frequency tags 14, as shown in FIG. 11. Then, the control flow goes to SD to determine whether the number of repetition of SC is equal to or larger than a predetermined number "n" (e.g., 100). If a negative determination is obtained in SD, the control flow goes back to SC. If an affirmative determination is obtained in SD, the control routine of FIG. 7 is terminated.

The control for detection of the adjacent radio-frequency tag communication devices 12 is initiated with SA1 to generate a random number within a range from 0 to 1. Then, SA2 is implemented to determine whether the random number generated in SA1 is equal to or larger than a threshold value $Th_1$ (e.g., about 4/5). If an affirmative determination is obtained in SA2, the control flow goes to SA3 to control the directivity control portion 22 to set the transmitter antenna device and the receiver antenna device consisting of the plurality of transmitter/receiver antenna elements 20, in a non-directivity mode. SA4 is then implemented to repeatedly generate the ID number of the own interrogator for a predetermined length of time, and the control flow goes to SA10. If a negative determination is obtained in SA2, the control flow goes to SA5 to control the directivity control portion 22 to set the direction of signal reception by the receiver antenna device consisting of the plurality of transmitter/receiver antenna elements 20. The control flow then goes to SA6 to perform an operation to receive the signals from the other radio-frequency tag communication devices 12. SA7 is then implemented to determine whether the transmitter/receiver antenna elements 20 have received the signal from the other radio-frequency tag communication devices 12. If an affirmative determination is obtained in SA7, the control flow goes to SA8 to store the ID number of the interrogator of the detected other radio-frequency tag communication device 12 in relation to the direction of reception of the signal. Then, the control flow goes to SA10 to determine whether the operations to receive the signals in all directions are completed. If a negative determination is obtained in SA10, the control flow goes back to SA5 and the subsequent steps. If an affirmative determination is obtained in SA10, the control flow goes to SA10 to determine whether the communication cycle to detect the other radio-frequency tag communication devices 12 has been repeated a predetermined "m" number of times. If a negative determination is obtained in SA10, the control flow goes back to SA1 and the subsequent steps. If an affirmative determination is obtained in SA10, the control operation of FIG. 8 is terminated, and the control flow goes to the control operations of FIGS. 9 and 10 for synchronization with the adjacent radio-frequency tag communication devices 12.

The operation of FIGS. 9 and 10 for synchronization with the adjacent radio-frequency tag communication devices 12 is initiated with SB1 shown in FIG. 9, to control the directivity control portion 22 to set the transmitter antenna device and the receiver antenna device consisting of the plurality of transmitter/receiver antenna elements 20, in the non-directivity mode. SB2 is then implemented to generate the random number within the range from 0 to 1. Then, the control flow goes to SB3 to determine whether the random number generated in SB2 is equal to or larger than a threshold $Th_2$ (e.g., about 4/5). If a negative determination is obtained in SB3, the control flow goes to SB10 to perform an operation to receive the signals from the other radio-frequency tag communication devices 12. SB11 is then implemented to determine whether the own interrogator has been called by any other radio-frequency tag communication device 12. If an affirmative determination is obtained in SB3, the control flow goes to SB4 to perform an operation to call the other radio-frequency tag communication device 12 the interrogator ID number of which has been stored in SA8. The control flow then goes to SB5 to determine whether a reply has been received from the other radio-frequency tag communication device 12 in response to the call made in SB4. If a negative determination is obtained in SB5, the control flow goes back to SB2 and the subsequent steps. If an affirmative determination is obtained in SB5, the control flow goes to SB6 to determine the timing of communication in the direction of the called other radio-frequency tag communication device 12 which has replied to the call. Then, SB7 is implemented to transmit the determined timing of communication toward the radio-frequency tag communication device 12 which has replied to the call. The control flow then goes to SB8 to determine whether the reply signal received from the called other radio-frequency tag communication device 12 which has replied to the call is a permission signal. If a negative determination is obtained in SB8, the control flow goes back to SB6 to change the timing of communication, and then to the subsequent steps. If an affirmative determination is obtained in SB8, the control flow goes to SB9 to determine whether the communication with all of the adjacent radio-frequency tag communication devices 12 is completed. If an affirmative determination is obtained in SB9, the control flow goes to SB17 and the subsequent steps shown in FIG. 10. If a negative determination is obtained in SB9, the control flow goes back to SB2 and the subsequent steps. If a negative determination is obtained in SB3, the control flow goes to SB10 to perform an operation to receive If a negative determination is obtained in SB11, that is, if the radio-frequency tag communication device 12 in question has not been called by any other radio-frequency tag communication device 12, the control flow goes back to SB2 and the subsequent steps. If an affirmative determination is obtained in SB11, the control flow goes to SB12 to transmit a reply signal toward the other radio-frequency tag communication device 12. Then, SB13 is implemented to receive from the other radio-frequency tag communication device 12 a timing of communication with the radio-frequency tag communication device 12 in question. The control flow then goes to SB14 to determine whether to permit the transmission from the other radio-frequency tag communication device 12 at the timing of communication received in SB13. If an affirmative determination is obtained in SB14, the control flow goes to SB15 to transmit a permission signal to the other radio-frequency tag communication device 12, and then goes to SB9 and the subsequent steps. If a negative determination is obtained in SB14, the control flow goes to SB16 to transmit a non-permission signal to the other radio-frequency tag communication device 12, and then goes to SB13 and the subsequent steps.

In SB17 of FIG. 10 following the control operation shown in FIG. 9, the transmitter antenna device and the receiver antenna device consisting of the plurality of transmitter/receiver antenna elements 20 are set in the non-directivity mode. Then, the control flow goes to SB18 to generate the random number within the range from 0 to 1. SB19 is them implemented to determine whether the random number generated in SB19 is equal to or larger than the threshold $Th_2$. If a negative determination is obtained in SB19, the control flow goes to SB26 to perform an operation to receive the signals from the other radio-frequency tag communication devices 12, and then to SB27 to determine whether the radio-frequency tag communication device 12 in question has been called by any other radio-frequency tag communication device 12. If an affirmative determination is obtained in SB19, the control flow goes to SB20 perform an operation to call the other radio-frequency tag communication device 12. Then, the control flow goes to SB21 to determine whether a reply has been received from the other radio-frequency tag communication device 12 in response to the call made in SB20. If a negative determination is obtained in SB21, the control flow goes to SB18 and the subsequent steps. If an affirmative determination is obtained in SB21, the control flow goes to SB22 to transmit to the called other radio-frequency tag communication device 12 the required number of transmissions (number of transmissions required to transmit the signals in all directions) from the radio-frequency tag communication device 12 in question toward the adjacent radio-frequency tag communication devices 12. The control flow then goes to SB23 to receive the number of transmissions from the called other radio-frequency tag communication device 12 toward the other adjacent radio-frequency tag communication devices 12. Then, SB24 is implemented to determine whether the communication with all of the adjacent radio-frequency tag communication devices 12 is completed. If a negative determination is obtained in SB24, the control flow goes back to SB18 and the subsequent steps. If an affirmative determination is obtained in SB24, the control flow goes to SB25 to detect the largest number of communications of the called other radio-frequency tag communication devices 12 with the radio-frequency tag communication device 12 in question or the other adjacent radio-frequency tag communication devices 12. The present control of FIGS. 9 and 10 is terminated with SB25, and is followed by the control of FIG. 11 for communication to detect the radio-frequency tags 14.

If a negative determination is obtained in SB27, that is, if the radio-frequency tag communication device 12 in question has not been called by any other radio-frequency tag communication device 12, the control flow goes back to SB18 and the subsequent steps. If an affirmative determination is obtained in SB27, that is, if the radio-frequency tag communication device 12 has been called by any other radio-frequency tag communication device 12, the control flow goes to SB28 to transmit a reply signal toward the calling radio-frequency tag communication device 12. Then, the control flow goes to SB29 to receive the number of transmissions from the calling radio-frequency tag communication device 12 to the other adjacent radio-frequency tag communication devices 12. Then, SB30 is implemented to transmit the number of transmissions from the radio-frequency tag communication device 12 in question to the calling radio-frequency tag communication device 12. SB30 is followed by the above-described step S24 and the following step.

The control of FIG. 11 for communication to detect the radio-frequency tags 14 is initiated with SC1 to set "i" to 1. Then, SC2 is implemented to determine whether a timing Ti is the timing of communication of the radio-frequency tag communication device 12 in question with the radio-frequency tags 14. If a negative determination is obtained in SC, the control flow goes to SC7 to wait for the timing of communication, and then to SC5 and the subsequent steps. If an affirmative determination is obtained in SC2, the control flow goes to SC3 to control the directivity control portion 22 to set the direction of transmission and reception of the transmitter and receiver antenna devices consisting of the transmitter/receiver antenna elements 20, to a direction Di. Then, the control flow goes to SC4 to control the main-carrier generating portion 16 and transmitted-signal generating portion 18 to transmit the transmitted signals from the transmitter/receiver antenna elements 20 in the direction Di, for detecting the desired radio-frequency tag 14. Then, SS5 is implemented to increment the value "i" by one, and SC6 is implemented to determine whether the value "i" is equal to a predetermined maximum number of communications. If a negative determination is obtained in SC6, the control flow goes back to SC2 and the subsequent steps. If an affirmative determination is obtained in SC5, the control operation of FIG. 11 is terminated, and step SD shown in FIG. 7 is implemented.

In the control routines shown in FIGS. 7-11, the steps SA3, SB1, SB6, SB17 and SC correspond to the transmission control portion 40, and the steps SA3, SA5, SB1, SB17 and SC correspond to the reception control portion 42, while the step SC corresponds to the received-signal combining portion 44 and the received-signal demodulating portion 46. Further, the steps SA and SB correspond to the radio-frequency-tag communication judging portion 48 and the inter-interrogator communicating portion 52, and the steps SC1 through SC7 correspond to the radio-frequency-tag-position detecting portion 50.

In the present embodiment described above, each radio-frequency tag communication device 12 includes the transmission control portion 40 (steps SA3, SB1, SB6, SB17 and SC) operable to control the transmission of the transmitted signals, so as to prevent overlapping of the areas of communication of the radio-frequency tag communication device 12 in question with the other radio-frequency tag communication devices 12, making it possible to maximize a spacing distance between the adjacent radio-frequency tag communication devices 12, and effectively prevent concurrent receptions of the transmitted signals by the plurality of radio-frequency tags 14. Namely, each radio-frequency tag communication device 12 of the radio-frequency tag communication system permits the communication system to have a sufficiently large area of communication with a minimum required number of interrogators.

Further, the transmission control portion 40 controls the transmission of the transmitted signal such that the transmitted signal is transmitted at a timing different from a timing of transmission of the transmitted signal from the other radio-frequency tag communication devices 12, making it possible to effectively prevent each radio-frequency tag 14 from concurrently receiving the transmitted signals from the radio-frequency tag communication devices.

Further, the radio-frequency tag communication device 12 further comprises the plurality of antenna elements 20 through which the transmitted signal is transmitted, and the transmission control portion 40 controls the direction of transmission of the transmitted signal by controlling the phase of the transmitted signal to be transmitted through each of the plurality of antenna elements 20, to thereby change the above-indicated. This arrangement effectively presents the radio-frequency tags 14 from concurrently receiving the transmitted signals from the plurality of radio-frequency tag communication devices 12.

Further, the radio-frequency tag communication device 12 further comprises the radio-frequency-tag communication judging portion 48 (steps SA and SB) operable to determine whether there is any radio-frequency tag 14 which exists within the area of communication of the radio-frequency tag communication device 12 in question and which is under communication with any other radio-frequency tag communication device 12, and the transmission control portion 40 inhibits the transmission of the transmitted signal when an affirmative determination is obtained by the radio-frequency tag communication judging portion 48. This arrangement prevents transmission of the transmitted signal to the above-indicated radio-frequency tag 14 under communication with the other radio-frequency tag communication device 12.

Further, the radio-frequency tag communication device 12 further comprising the plurality of antenna elements 20 through which the reply signals are received from the radio-frequency tags 14, and the reception control portion 42 (steps SA3, SA6, SB1, SB17 and SC) operable to control the direction of reception of the reply signals by controlling the phase of each of the reply signals received through the plurality of antenna elements 20. This arrangement permits adequate reception of the reply signals from the radio-frequency tags 14.

Further, the reception control portion 40 is operable to control the amplitude of each of the transmitted signals to be transmitted from the plurality of antenna elements 20, and the reception control portion 42 is operable to control the amplitude of each of the reply signals received through the plurality of antenna elements 20. This arrangement permits adequate adjustments of the directions of transmission and reception.

Further, the area of communication of the radio-frequency tag communication device which is used for the determination by the radio-frequency-tag communication judging portion 48 is determined on the basis of the direction of reception of the reply signals which is controlled by the reception control portion 42. This arrangement permits adequate adjustment of the area of communication used for the above-indicated determination.

Further, the transmission control portion 40 controls the phase of each of the transmitted signals to be transmitted through the plurality of antenna elements 20 such that the direction of transmission of the transmitted signals is coincident with the direction of reception of the reply signals. This arrangement permits efficient communication with the radio-frequency tags 14. Moreover, since the area of transmission is coincident with the area of reception, it is possible to adequately determine whether any radio-frequency tag 14 under communication with any other radio-frequency tag communication device exists within the area of transmission. Accordingly, it is possible to prevent the transmission of the transmitted signal to this radio-frequency tag 14 under communication with the other radio-frequency tag communication device.

Preferably, the reception control portion controls the phase of each of the reply signals received by the plurality of antenna elements 20 such that the direction of reception of the rely signals is coincident with the direction of transmission of the transmitted signals. This arrangement permits efficient communication with the radio-frequency tags 14. Moreover, since the area of transmission is coincident with the area of reception, it is possible to adequately determine whether any radio-frequency tag 14 under communication with any other radio-frequency tag communication device exists within the area of transmission. Accordingly, it is possible to prevent the transmission of the transmitted signal to this radio-frequency tag 14 under communication with the other radio-frequency tag communication device.

Further, the radio-frequency tag communication device further comprises the radio-frequency-tag-position detecting portion 50 (steps SC1 through SC7) operable to detect the position of the radio-frequency tag 14 existing within the area of communication of the radio-frequency tag communication device. This arrangement permits detection of the desired radio-frequency tag 14.

In the radio-frequency tag communication system 10 comprising the plurality of radio-frequency tag communication devices 12 each constructed as described above, the transmission control portions 40 of the radio-frequency tag communication devices 12 transmit the transmitted signals in synchronization with each other, so as to prevent overlapping areas of communication of the plurality of radio-frequency tag communication devices 12. The present radio-frequency tag communication system 10 has a sufficiently large area of communication with a minimum required number of interrogators.

Further, the transmission control portions 40 of the respective radio-frequency tag communication devices 12 control the transmission of the transmitted signals in synchronization with each other, such that the transmitted signals are transmitted by the radio-frequency tag communication devices 12 at respective different timings, making it possible to effectively prevent the radio-frequency tags from concurrently receiving the transmitted signals from the radio-frequency tag communication devices.

Further, the transmission control portions 40 of the plurality of radio-frequency tag communication devices 12 control directions of transmissions of the transmitted signals, in synchronization with each other, making it possible to prevent the radio-frequency tag from concurrently receiving the transmitted signals from the plurality of radio-frequency tag communication devices.

While the preferred embodiment of the present invention has been described in detail by reference to the drawings, it is to be understood that the invention is not limited to this embodiment, but may be otherwise embodied.

Figure 12:
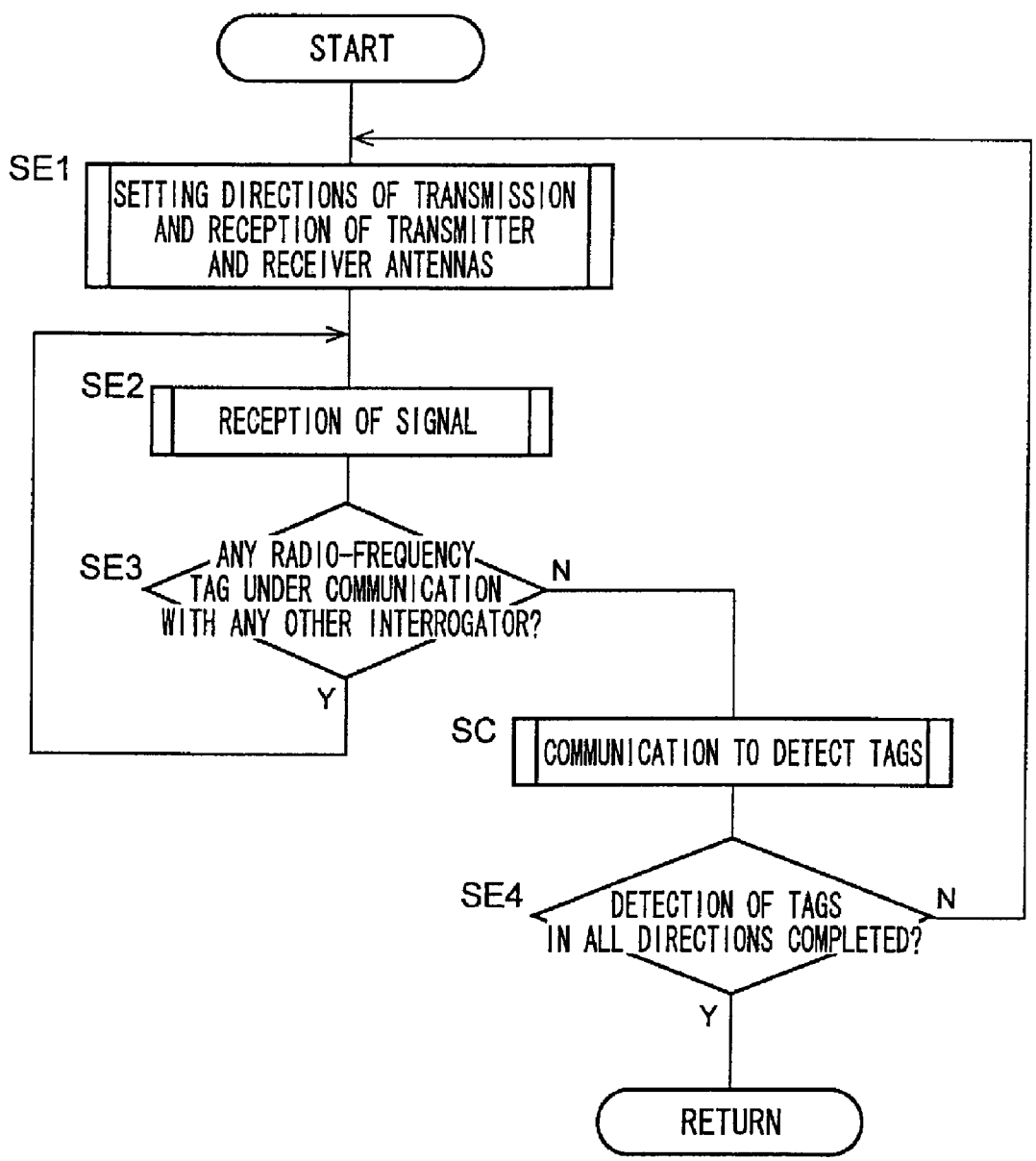
FIG. 12 is a flow chart illustrating control operations of the control portion of each radio-frequency tag communication device of FIG. 2 for communication with the radio-frequency tags and for detection of the radio-frequency tag under communication with the other radio-frequency tag communication device.

FIG. 12 is the flow chart illustrating control operations of the control portion 30 of each radio-frequency tag communication device 12 for communication with the radio-frequency tags 14 and for detection of the radio-frequency tag 14 under communication with the other radio-frequency tag communication device (interrogator). The control routine of FIG. 12 is repeatedly executed with a predetermined cycle time. The control routine is initiated with SE1 to control the directivity control portion 22 to set the direction of transmission of the transmitter antenna device consisting of the plurality of transmitter/receiver antenna elements 20, and the direction of reception of the receiver antenna device consisting of the antenna elements 20. Then, the control flow goes to SE2 to receive the reply signals transmitted from the radio-frequency tags 14. The control flow then goes to SE3 corresponding to the radio-frequency-tag communication judging portion 48, to determine whether there is any radio-frequency tag 24 under communication with any other radio-frequency tag communication device, that is, whether the reply signal has been received from any radio-frequency tag 14. If an affirmative determination is obtained in SE3, the transmitted signal is not transmitted to that radio-frequency tag 14, and the control flow goes to SE2. If a negative determination is obtained in SE3, the control flow goes to SC to effect communication to detect the radio-frequency tags 14 as illustrated in FIG. 11. Then, SE4 is implemented to determine whether the operations to detect the radio-frequency tags 14 in all direction are completed. If a negative determination is obtained in SE4, the control flow goes back to SE1 and the subsequent steps. If an affirmative determination is obtained in SE4, the execution of this control routine is terminated. Thus, the present embodiment is arranged to make the determination as to whether there is any radio-frequency tag 14 under communication with any conventional radio-frequency tag communication device not including the inter-interrogator communicating portion 52, by determining whether the present radio-frequency tag communication device 12 has received the reply signal transmitted from the radio-frequency tag 14 in response to the transmitted signal transmitted from the above-indicated conventional radio-frequency tag communication device. The present radio-frequency tag communication device 12, which may be used in the radio-frequency tag communication system also including the conventional radio-frequency tag communication device, makes it possible to prevent the radio-frequency tag 14 from concurrently receiving the transmitted signals from the plurality of radio-frequency tag communication devices.

Figure 13:
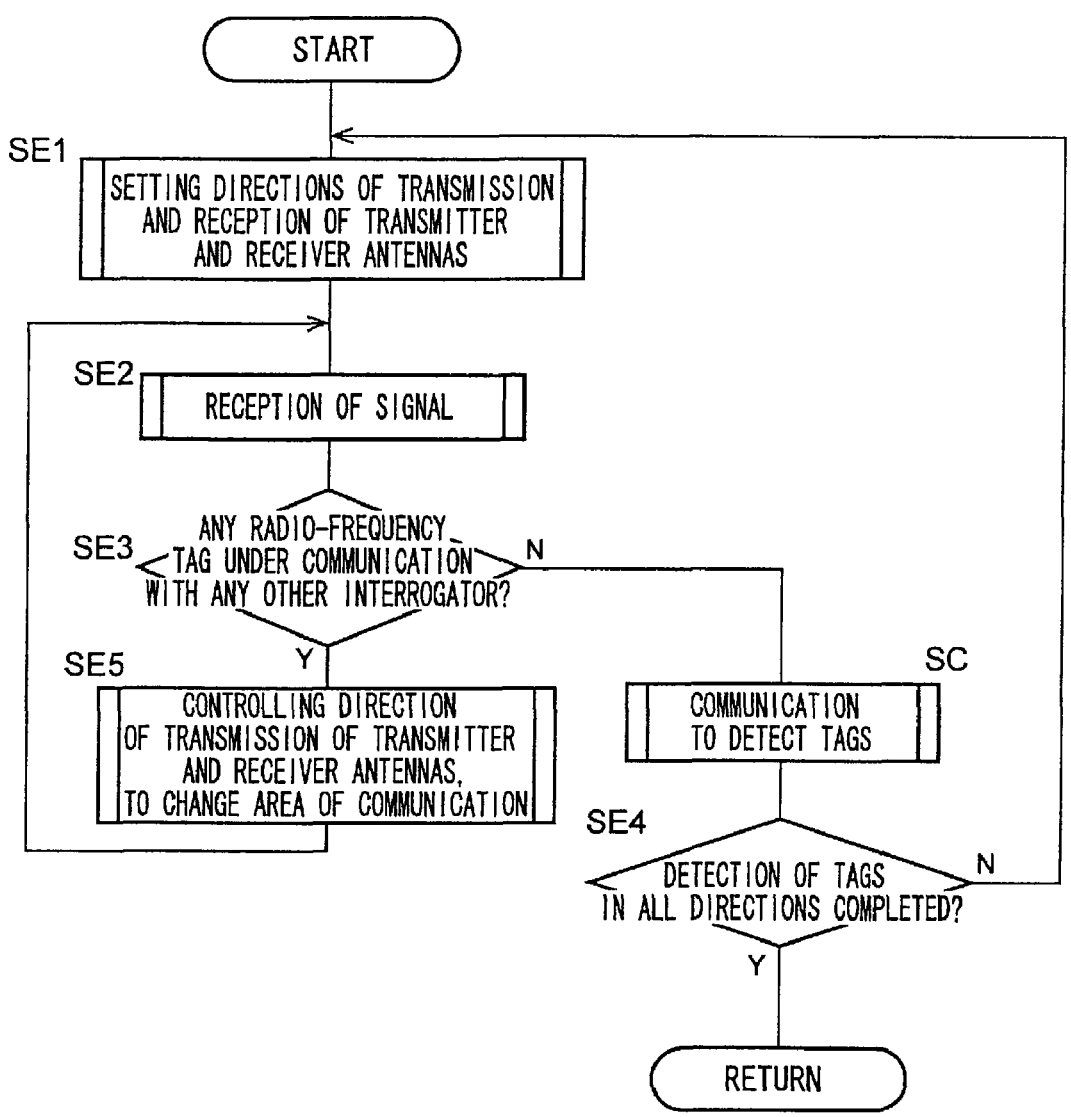
FIG. 13 is a flow chart illustrating modified control operations of the control portion of each radio-frequency tag communication device of FIG. 2 for communication with the radio-frequency tags and for detection of the radio-frequency tag under communication with the other radio-frequency tag communication device.

FIG. 13 is the flow chart illustrating modified control operations of the control portion 30 of each radio-frequency tag communication device 12 for communication with the radio-frequency tags 14 and for detection of the radio-frequency tag 14 under communication with the other radio-frequency tag communication device (interrogator).). The control routine of FIG. 12 is repeatedly executed with a predetermined cycle time. The steps SE1 through SE4 in FIG. 13 are identical with those in FIG. 12, and will not be described. In the control routine of FIG. 13, the control flow goes to SE5 if the affirmative determination is obtained in SE3, that is, if there is any radio-frequency tag 14 under communication with any other radio-frequency tag communication device. This step SE5 is provided to control the directivity control portion 22 for controlling the direction of transmission of the transmitted signal, to change the area of communication to an area which does not include the detected radio-frequency tag 14. Thus, the transmission control portion 40 is arranged to change the area of communication by changing the direction of transmission of the transmitted signal when the affirmative determination is obtained by the radio-frequency-tag communication judging portion 48. Accordingly, the present arrangement not only effectively prevents the transmission of the transmitted signal to the radio-frequency tag 14 under communication with any other radio-frequency tag communication device, but also permits communication with the radio-frequency tags 14 within the changed area of communication, making it possible to enlarge the overall area of communication of the plurality of radio-frequency tag communication devices.

Although the transmission control portion 40, reception control portion 42, received-signal combining portion 44, received-signal demodulating portion 46, radio-frequency-tag communication judging portion 48 and radio-frequency-tag-position detecting portion 50 which are provided in the embodiment described above are functional portions of the control portion 30, those portions may be mutually separate control devices. Further, the control functions performed by those functional portions or control devices may be performed by either digital signal processing operations or analog signal processing operations.

In the illustrated embodiment described above, each radio-frequency tag communication device 12 is provided with the plurality of transmitter/receiver antenna elements 20 for transmitting the transmitted signals toward the radio-frequency tags 14 and for receiving the reply signals transmitted from the radio-frequency tags 14 in response to the transmitted signals. However, each radio-frequency tag communication device 12 may be provided with a plurality of transmitter antenna elements for transmitting the transmitted signals toward the radio-frequency tags 14, and a plurality of receiver antenna elements for receiving the reply signals transmitted from the radio-frequency tags 14 in response to the transmitted signals.

In the illustrated embodiment described above, the transmission control portion 40 is arranged to control the direction of transmission by controlling the phase and amplitude of each transmitted signal to be transmitted from each of the plurality of transmitter/receiver antenna elements 20. However, the transmission control portion 40 may be arranged to control only the phase of each transmitted signal. This arrangement also permit adequate adjustment of the area of communication. Similarly, the reception control portion 42 may be arranged to control only the phase of each received signal.

Other embodiments of the present invention will be described in detail by reference to the drawings. In the following description, the same reference signals as used in the preceding embodiment will be used to identify the corresponding elements, which will not be described.

Embodiment 2

Figure 14:
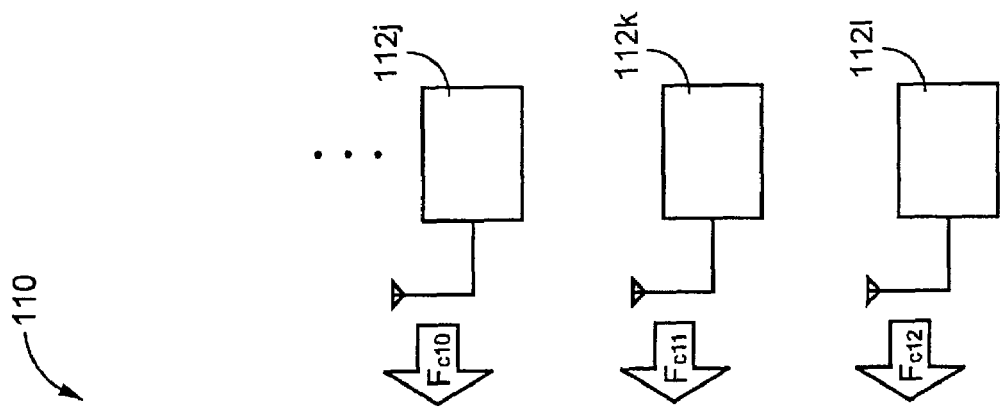
FIG. 14 is a view showing a radio-frequency tag detecting system constructed according to one embodiment of this invention.
Figure 14:
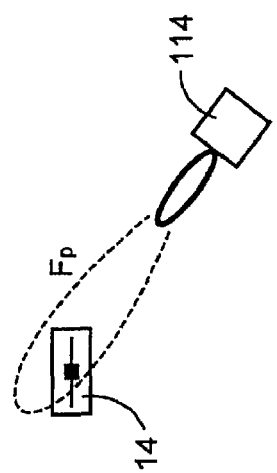
Figure 14:
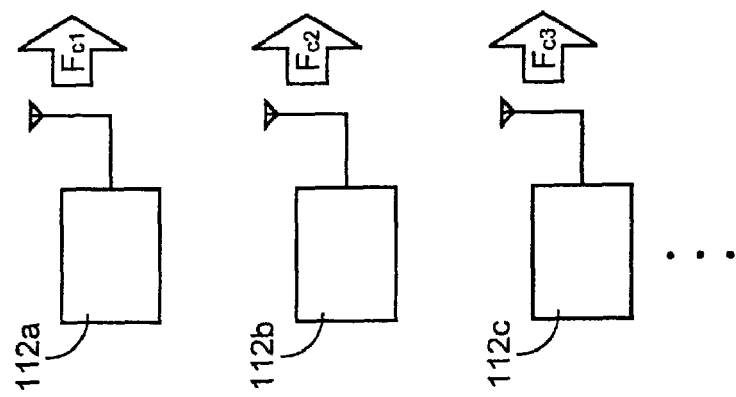

FIG. 14 is the view showing a radio-frequency tag detecting system 110 constructed according to one embodiment of a third aspect of this invention. As shown in FIG. 14, the radio-frequency tag detecting system 110 of this invention is a so-called RFID (radio-frequency identification) system including: a plurality of stationary radio-frequency tag communication devices (e.g., 12 devices) 112a, 112b, 112c, . . . 112l (hereinafter referred to simply as "stationary radio-frequency tag communication devices 112", unless otherwise specified) located at respective positions; at least one portable radio-frequency tag communication device or handy reader 114 (one device in the embodiment as shown in FIG. 14) operable to detect the at least one radio-frequency tag 14 located within the areas of communication of the plurality of stationary radio-frequency tag communication devices 112; and the at least one radio-frequency tag 14. The stationary radio-frequency tag communication devices 112 and the portable radio-frequency tag communication device 114 function as interrogators of the RFID system, while the radio-frequency tag 14 functions as a transponder of the RFID system. Namely, the stationary radio-frequency tag communication devices 112 are arranged to transmit interrogating waves (transmitted signals) $F_{c1}, F_{c2}, F_{c3}, \ldots F_{c12}$ (hereinafter referred to simply as "interrogating waves F", unless otherwise specified) toward the radio-frequency tag 14, and to receive a reply wave (reply signal) $F_r$ transmitted from the radio-frequency tag 14, for communication with the radio-frequency tag 14. The portable radio-frequency tag communication device 114 is arranged to transmit an interrogating wave $F_p$ toward the radio-frequency tag 14, and to receive the reply wave $F_r$ transmitted from the radio-frequency tag 14, for thereby detecting the radio-frequency tag 14. In a preferred form of use of the present radio-frequency tag detecting system 110, the user of the system carriers the portable radio-frequency tag communication device 114, and performs an operation to detect the radio-frequency tag 14 while referring to views provided by a display portion 160 of the portable radio-frequency tag communication device 114.

Figure 15:
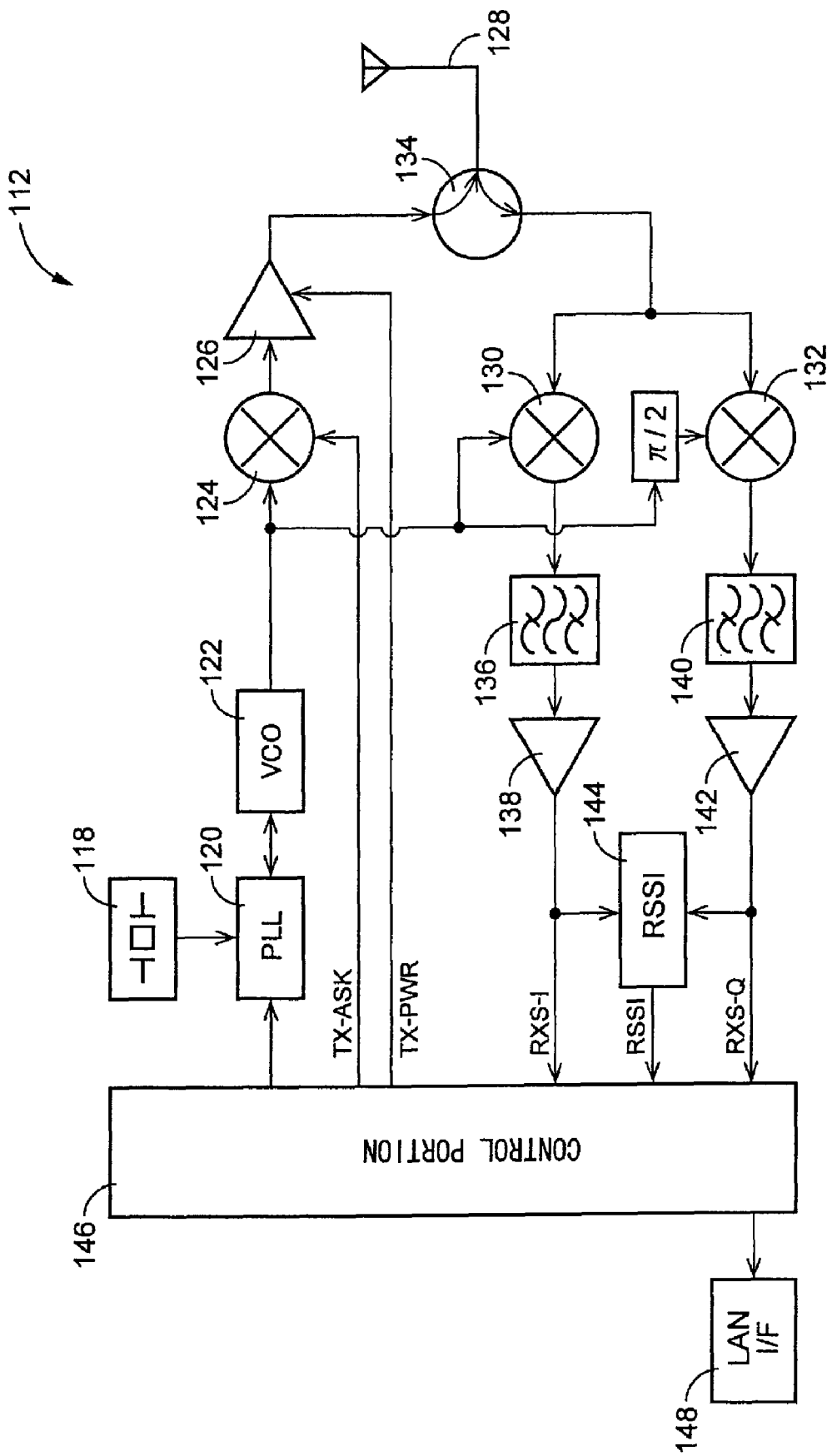
FIG. 15 is a view showing an arrangement of each stationary radio-frequency tag communication device provided in the radio-frequency tag detecting system of FIG. 14.

Referring to FIG. 15, there is shown an arrangement of each stationary radio-frequency tag communication device 112. As shown in FIG. 15, this stationary radio-frequency tag communication device 112 includes: a reference-frequency generating portion 118 operable to generate a main carrier wave of the interrogating wave $F_c$; a PLL (phase-locked loop) 120 operable to set the frequency of the main carrier wave on the basis of a reference wave generated by the reference-signal generating portion 118 and a control signal received from a control portion 146; a VCO (voltage controlled oscillator) 122 operable to control the frequency of the main carrier wave according to a control voltage received from the PLL 120; a main-carrier modulating portion 124 operable to effect amplitude-modulating the main carrier wave of a predetermined frequency controlled by the VCO 122, on the basis of a predetermined control signal TX-ASK, for thereby generating a transmitted signal; a transmitted-signal amplifying portion 126 operable to amplify the transmitted signal generated by the main-carrier modulating portion 124, on the basis of a predetermined control signal TX-PWR; an antenna 128 functioning as a transmitter/receiver antenna device operable to transmit, as the interrogating wave $F_c$, the transmitted signal received from the transmitted-signal amplifying portion 126, toward the radio-frequency tag 14, and to receive the reply wave $F_r$ transmitted from the radio-frequency tag 14 in response to the interrogating wave $F_c$; an I-phase-signal converting portion 130 and a Q-phase-signal converting portion 132 which are operable to convert the reply signal received by the antenna 128, into an I-phase signal and a Q-phase signal that are perpendicular to each other; a transmission/reception separating portion 134 operable to apply the transmitted signal from the transmitted-signal amplifying portion 126 to the antenna 128, and to apply the reply signal from the antenna 128 to the I-phase-signal and Q-phase-signal converting portions 130, 132; an I-phase-signal BPF (band pass filter) 136 operable to extract a predetermined frequency band from the I-phase signal received from the I-phase-signal converting portion 130; an I-phase-signal amplifying portion 138 operable to amplify the I-phase signal received from the I-phase-signal BPF 136; a Q-phase-signal BPF 140 operable to extract a predetermined frequency band from the Q-phase signal received from the Q-phase-signal converting portion 132; and a Q-phase-signal amplifying portion 142 operable to amplify the Q-phase signal received from the Q-phase-signal BPF 140; an RSSI (received signal strength indicator) 144 operable to detect intensities of the I-phase signal and Q-phase signal received from the I-phase-signal amplifying portion 136 and Q-phase-signal amplifying portion 142; the above-indicated control portion 146 for controlling the operations of the stationary radio-frequency tag communication device 112; and a LAN interface 148 for connecting the control portion 146 to a controller 152 (described below) through a LAN cable 150. The transmission/reception separating portion 134 is preferably a circulator or a directional coupler.

The control portion 146 indicated above is a so-called microcomputer which incorporates a CPU, a ROM and a RAM and which operates to implement signal processing operations according to programs stored in the ROM, while utilizing a temporary data storage function of the RAM, to implement basic control operations such as transmission of the interrogating wave $F_c$ toward the radio-frequency tag 14 according to a command received from the controller 152 (described below), and reception of the reply wave $F_r$ transmitted from the radio-frequency tag 14 in response to the interrogating wave $F_c$. The transmitted signal to be transmitted toward the radio-frequency tag 14 is the wave including an interrogating or inquiry command requesting the radio-frequency tag 14 to transmit a reply if the radio-frequency tag 14 has a specified 1D. If the radio-frequency tag 14 which has received the transmitted signal has the ID specified by the inquiry command, this radio-frequency tag 14 transmits the reply signal including an answer to the inquiry command.

Figure 16:
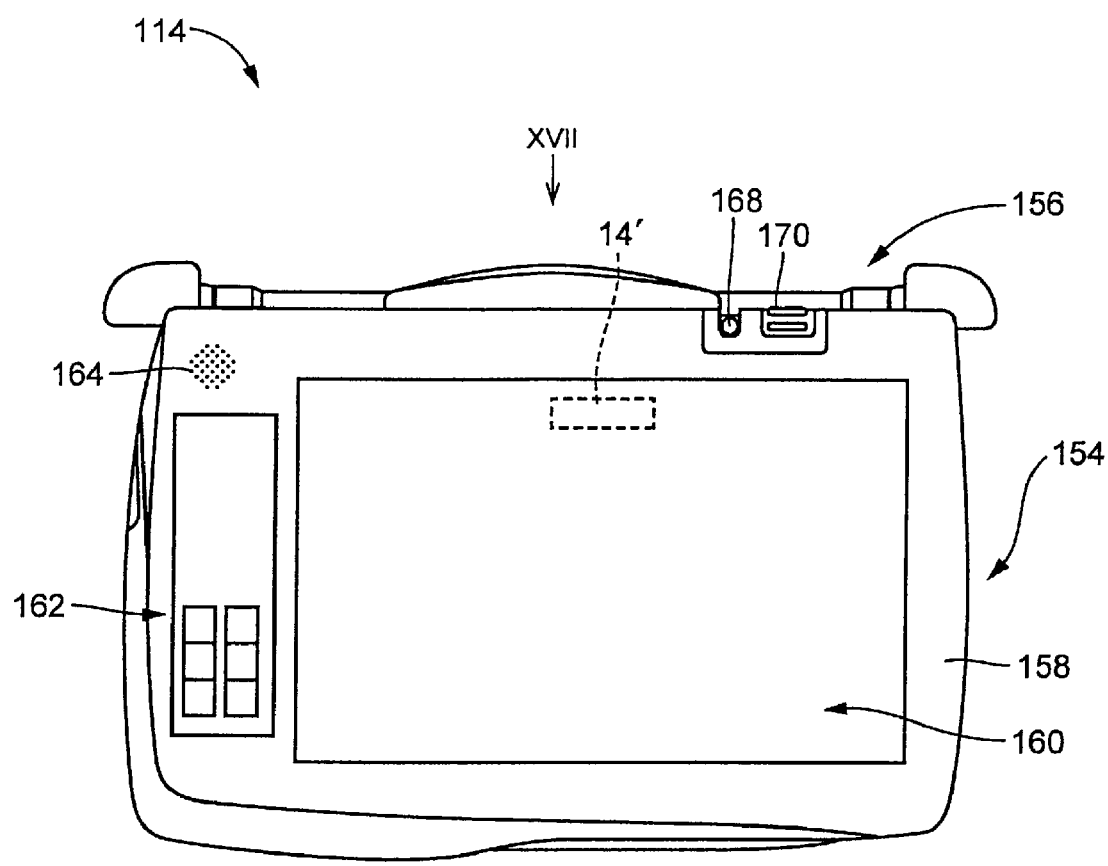
FIG. 16 is a plan view showing an external appearance of a portable radio-frequency tag communication device provided in the radio-frequency tag detecting system of FIG. 14.
Figure 17:
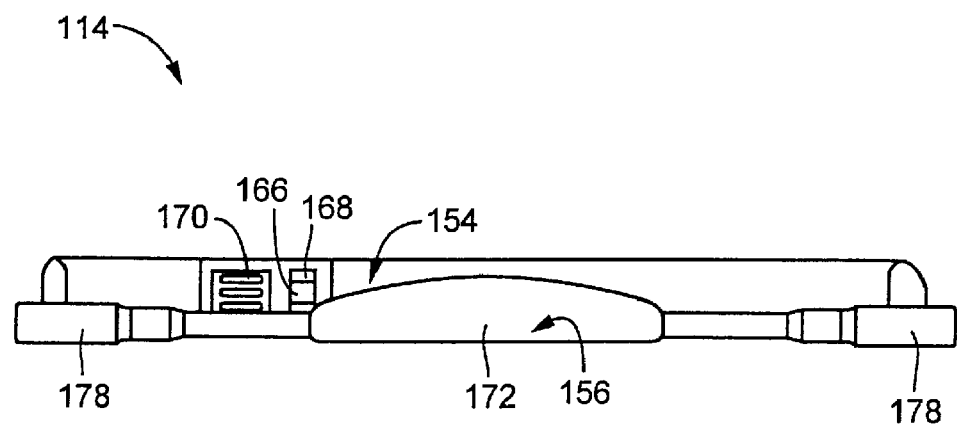
FIG. 17 is a rear view of the portable radio-frequency tag communication device taken in a direction of arrow XVII of FIG. 16.

FIG. 16 is the plan view showing an external appearance of the portable radio-frequency tag communication device 114, while FIG. 17 is the rear view of the portable radio-frequency tag communication device 114 taken in a direction of arrow XVII of FIG. 16. As shown in FIGS. 16 and 17, the portable radio-frequency tag communication device 114 consists of a main unit 154, and an antenna unit 156 removably mounted on the main unit 154. The main unit 154 includes: a casing 158; a display portion 160 disposed on a planar part of the casing 158; an operating portion 162 disposed on one side of the display portion 160; a sound generating device 164 such as a buzzer, an alarm indicator or a speaker; and a CCD camera 166 disposed at one end portion of the casing 158. Preferably, an identification radio-frequency tag 14' having the same arrangement of each radio-frequency tag 14 described above by reference to FIG. 6 is built in the casing 158, or attached to the rear surface of the casing 158.

The operating portion 162 is provided with an input device which includes keys, pushbuttons, switches and pads and which is used to perform operations to activate the display portion 160 and to detect the radio-frequency tag 14. The CCD camera 166 is received in a tubular member 168 which is disposed on the casing 158 such that the tubular member 168 is rotatable about an axis relative to the casing 158. The tubular member 168 has an integrally formed knob portion 170, which is manually held to pivot the tubular member 168 relative to the casing 158, for thereby rotating the CCD camera 166, to move the field of view of the CCD camera 166 in the vertical direction within a relatively narrow range.

The antenna unit 156 includes: a unit base 172: a transmitter antenna 174 which is provided in the unit base 172, for transmitting the suitable interrogating wave $F_p$ to the radio-frequency tag 14; a plurality of receiver antennas (e.g., three antennas) 176a, 176b, 176c (hereinafter referred to simply as "receiver antennas 176", unless otherwise specified) which are supported by antenna support arms and which are provided for receiving the reply wave Fr from the radio-frequency tag 14; and antenna covers 178 accommodating the receiver antennas 176. In the example of FIGS. 16 and 17, the two receiver antennas 176a and 176c extend rightwards and leftwards from the unit base 172, while the receiver antenna 176b is accommodated within the unit base 172.

The unit base 172 is provided with a suitable fitting (not shown) engageable with an engaging portion (not shown) provided at a predetermined position on the main unit 154, so that the unit base 172 is removably mounted on the main unit 154. The receiver antennas 176a and 176c are disposed telescopically in the longitudinal directions with respect to the unit base 172, so that the distances of those receiver antennas 176a, 176c to the central receiver antenna 176b are adjustable such that the distances of the receiver antennas to the central receiver antenna 176b are always equal to each other.

Figure 18:
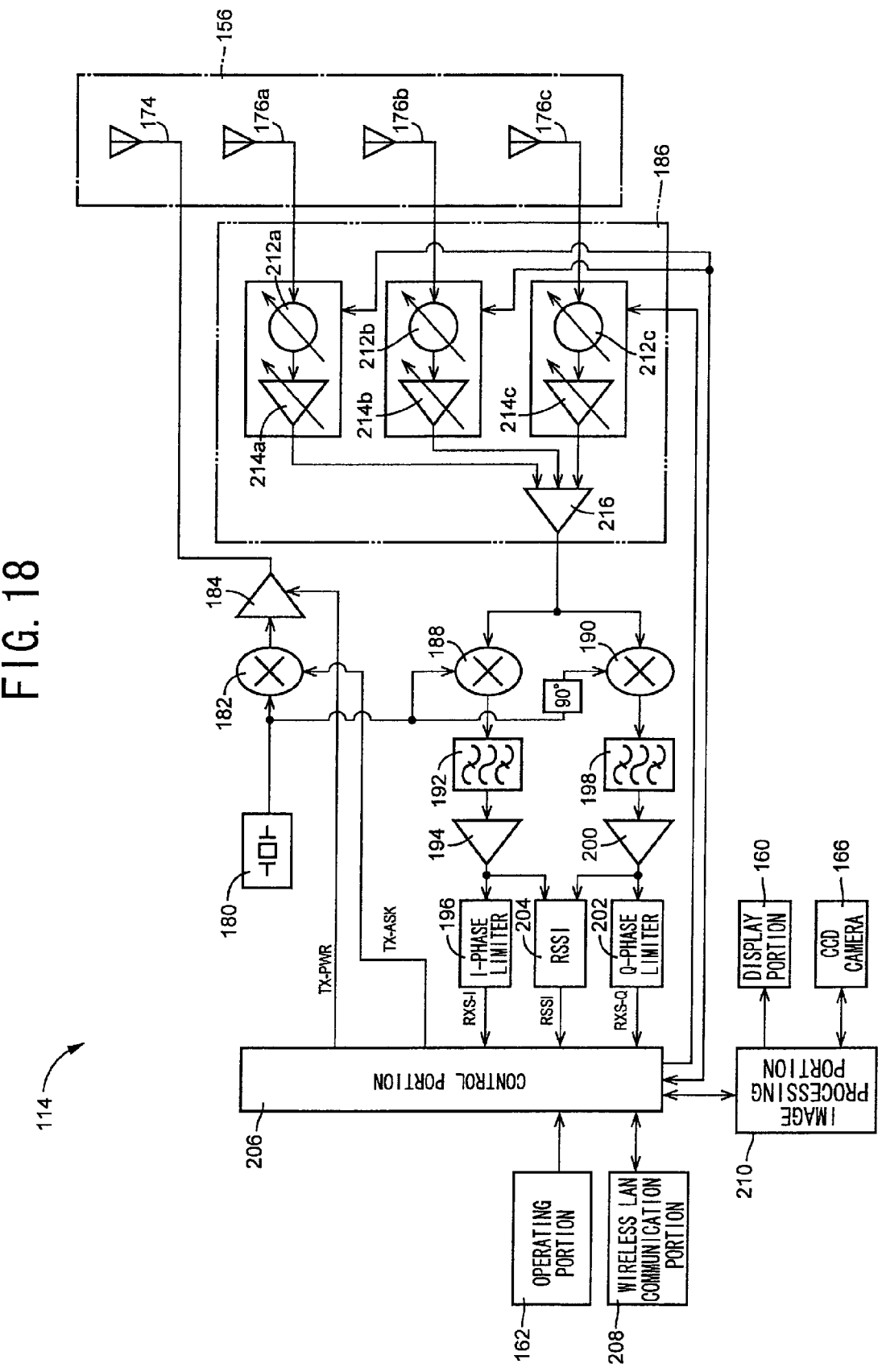
FIG. 18 is a view showing an arrangement of the portable radio-frequency tag communication device provided in the radio-frequency tag detecting system of FIG. 14.

Referring to FIG. 18, there will be described an arrangement of the portable radio-frequency tag communication device 114. As shown in FIG. 18, the portable radio-frequency tag communication device 114 includes: a reference-frequency generating portion 180 operable to generate a main carrier wave of the interrogating wave $F_p$; a main-carrier modulating portion 182 operable to effect amplitude-modulating the main carrier wave generated by the reference-frequency generating portion 180, on the basis of a predetermined control signal TX-ASK, for thereby generating a transmitted signal; a transmitted-signal amplifying portion 184 operable to amplify the transmitted signal generated by the main-carrier modulating portion 182, on the basis of a predetermined control signal TX-PWR, and to apply the amplified transmitted signal to the transmitter antenna 174; a directivity control portion 186 operable to control the direction of reception of the plurality of receiver antenna elements 176; an I-phase-signal converting portion 188 and a Q-phase-signal converting portion 190 which are operable to convert the received signals received from the directivity control portion 186, into an I-phase signal and a Q-phase signal that are perpendicular to each other; an I-phase-signal BPF 192 operable to extract a predetermined frequency band from the I-phase signal received from the I-phase-signal converting portion 188; an I-phase-signal amplifying portion 194 operable to amplify the I-phase signal received from the I-phase-signal BPF 192; an I-phase limiter 196 operable to detect the I-phase signal received from the I-phase-signal amplifying portion 194, and to apply a predetermined signal RXS-I to a control portion 206; a Q-phase-signal BPF 198 operable to extract a predetermined frequency band from the Q-phase signal received from the Q-phase-signal converting portion 190; and a Q-phase-signal amplifying portion 200 operable to amplify the Q-phase signal received from the Q-phase-signal BPF 198; a Q-phase limiter 202 operable to detect the Q-phase signal received from the Q-phase-signal amplifying portion 200, and to apply a predetermined signal RXS-Q to the control portion 206; an RSSI 204 operable to detect intensities of the I-phase signal and Q-phase signal received from the I-phase-signal amplifying portion 194 and Q-phase-signal amplifying portion 200, and apply a predetermined signal RSSI to the control portion 206; the above-indicated control portion 146 for controlling the operations of the portable radio-frequency tag communication device 114; a wireless LAN communication portion 208 operable to connect the control portion 206 to the controller 152 (described below); and an image processing portion 210 operable according to commands from the control portion 206, to control the display portion 160 for providing predetermined images, and to control an imaging operation of the CCD camera 166.

The directivity control portion 186 indicated above consists of phase control portions 212a, 212b, 212c (hereinafter referred to simply as "phase control portions 212", unless otherwise specified) operable to control the phase of each of the received signals received from the receiver antennas 176a, 176b, 176c; amplitude control portions 214a, 214b, 214c (hereinafter referred to simply as "amplitude control portions 214", unless otherwise specified) operable to control the amplitude of the received signals the phases of which have been controlled by the phase control portions 212; and an adder 216 operable to sum the received signals the amplitudes of which have been controlled by the amplitude control portions 214, and to apply the obtained sum to the I-phase converting portion 188 and Q-phase converting portion 190 described above. The directivity control portion 186 functions as a directivity control portion operable to change the directivity of the plurality of receiver antenna elements 176. The portable radio-frequency tag communication device 114 arranged as described above is capable of pinpoint-detecting the radio-frequency tag 14, with a so-called pencil beam having accurately controlled directivity. The directivity control portion 186 arranged as described above is constituted by a phased-array antenna well known in the art, and the phase control portions 212 and the amplitude control portions 214 are controlled according to control signals received from the control portion 206, to control the direction of reception of the receiver antennas 176.

Figure 19:
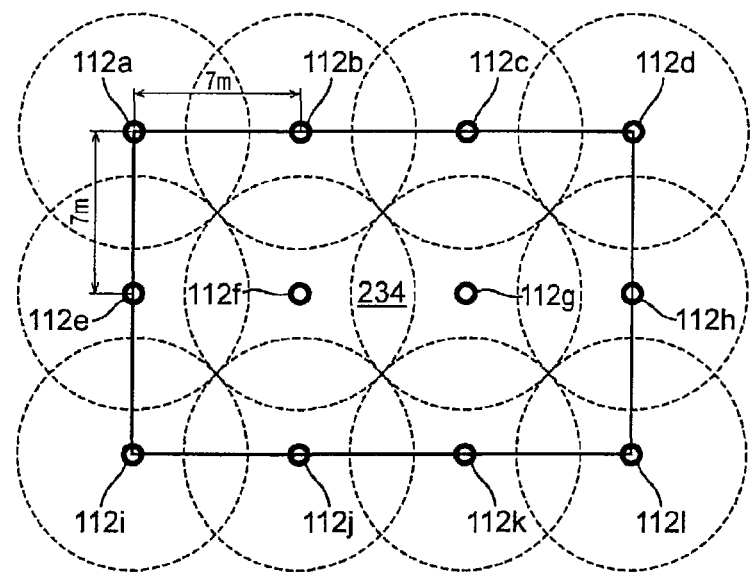
FIG. 19 is a view showing the plurality of stationary radio-frequency tag communication devices each of which is constructed as shown in FIG. 15 and which are arranged in a chamber.

Referring to FIG. 19, there will be described an arrangement of the plurality of stationary radio-frequency tag communication devices 112a through 112l disposed in a suitable chamber 234. The radio-frequency tag 14 in the present embodiment is of a passive type using a ultra high frequency, so that each stationary radio-frequency tag communication devices 112 functioning as an interrogator generally has a distance of communication of about 3-5 m. In the example of FIG. 19, the stationary radio-frequency tag communication devices 112a through 112l having the distance of communication of 5 m are disposed in the chamber 234 having dimensions of 14 m×21 m, such that the stationary radio-frequency tag communication devices 112 are arranged in a 3×4 matrix with a spacing distance of 7 m between the antennas 128 of the adjacent stationary radio-frequency tag communication devices 112. The twelve stationary radio-frequency tag communication devices 112 arranged as described above has an overall area of communication which covers the entire area of the chamber 234, as indicated in FIG. 19.

Figure 20:
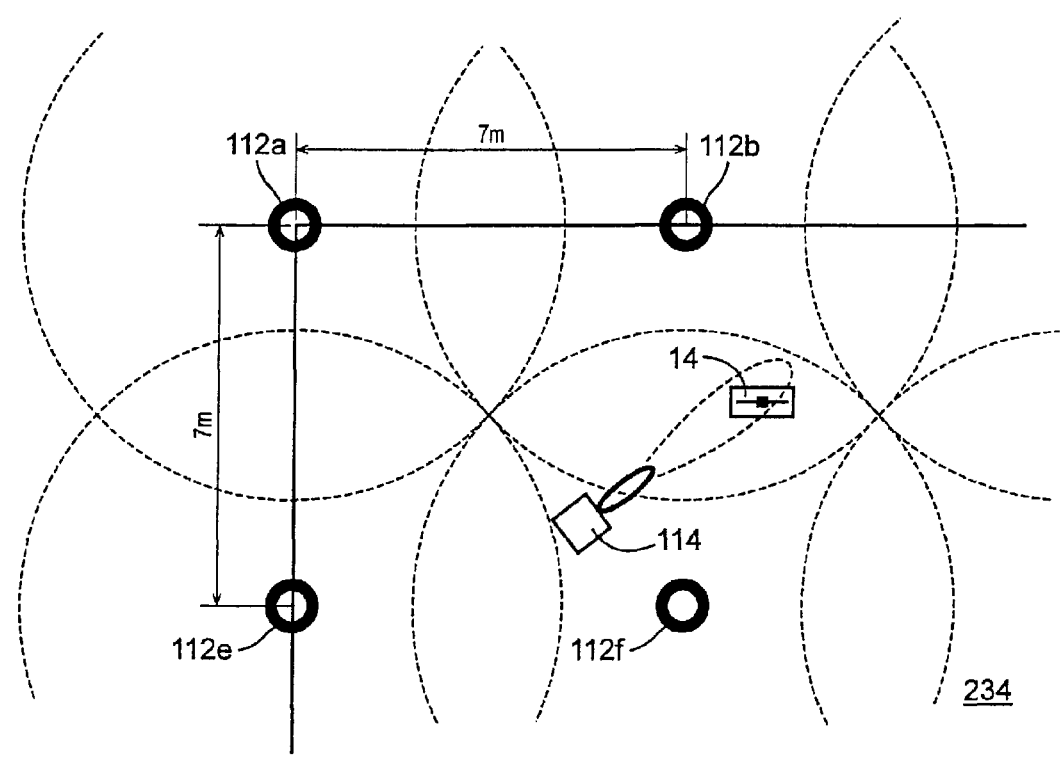
FIG. 20 is a view showing in enlargement a portion of the view of FIG. 19.

FIG. 20 is the view showing in enlargement a portion of the view of FIG. 19. As shown in FIG. 20, the radio-frequency tag detecting system 111 according to the present invention is arranged such that the plurality of stationary radio-frequency tag communication devices 112 first obtains an approximate position of the radio-frequency tag 14, and the portable radio-frequency tag communication device 114 then obtains an accurate position of the radio-frequency tag 14. The area of communication of the portable radio-frequency tag communication device 114 is narrower than the area of communication of the plurality of stationary radio-frequency tag communication devices 112, and is capable of pinpoint-detecting the position of the radio-frequency tag 14 with the pencil beam type antenna device having the accurately controlled directivity. That is, where the radio-frequency tag 14 is accommodated in a drawer of a desk (not shown) located within the chamber 234, this position of the radio-frequency tag 14 can be accurately detected.

Figure 21:
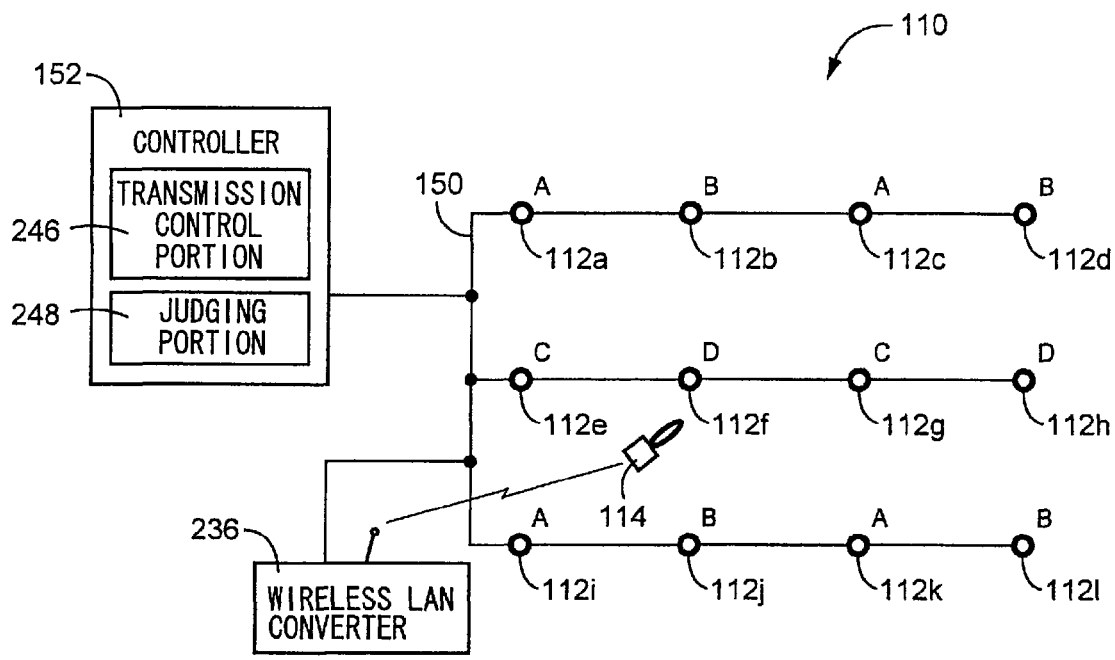
FIG. 21 is a view showing a controller for controlling the radio-frequency tag detecting system of FIG. 14.
Figure 22:
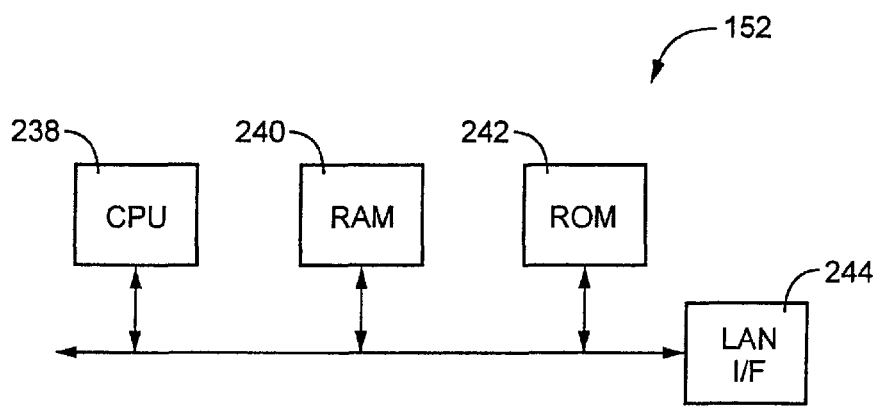
FIG. 22 is a view showing an arrangement of the controller of FIG. 21.

FIG. 21 is the view for explaining the controller 152 of the radio-frequency tag detecting system 110, and FIG. 22 is the view showing an arrangement of the controller 152. As shown in FIGS. 21 and 22, the controller 152 of the radio-frequency tag detecting system 110 incorporates a CPU 238, a RAM 240, a ROM 242 and a LAN interface 244, and performs signal processing operations according to programs stored in the ROM 242, while utilizing a temporary data storage function of the RAM 240. This controller 152 is connected through the LAN cable 150 to the plurality of stationary radio-frequency tag communication devices 112, for communication with those stationary radio-frequency tag communication devices 112. Further, the controller 152 is operable to effect wireless LAN communication with the portable radio-frequency tag communication device 114 through a wireless LAN converter 236. The controller 152 arranged as described above controls, in a coordinated fashion, the operation of the radio-frequency tag detecting system 110 to detect the radio-frequency tag 14, by controlling the plurality of stationary radio-frequency tag communication devices 112 and the portable radio-frequency tag communication device 114. To this end, the controller 152 includes: a transmission control portion 246 operable to control the transmission of the transmitted signals from the stationary radio-frequency tag communication devices 112 and the portable radio-frequency tag communication device 114; and a judging portion 248 operable to determine whether the identification tag 14' provided on the portable radio-frequency tag communication device 114 and the desired radio-frequency tag 14 are located within one of the areas of communication of the plurality of stationary radio-frequency tag communication devices 112.

Figure 23:
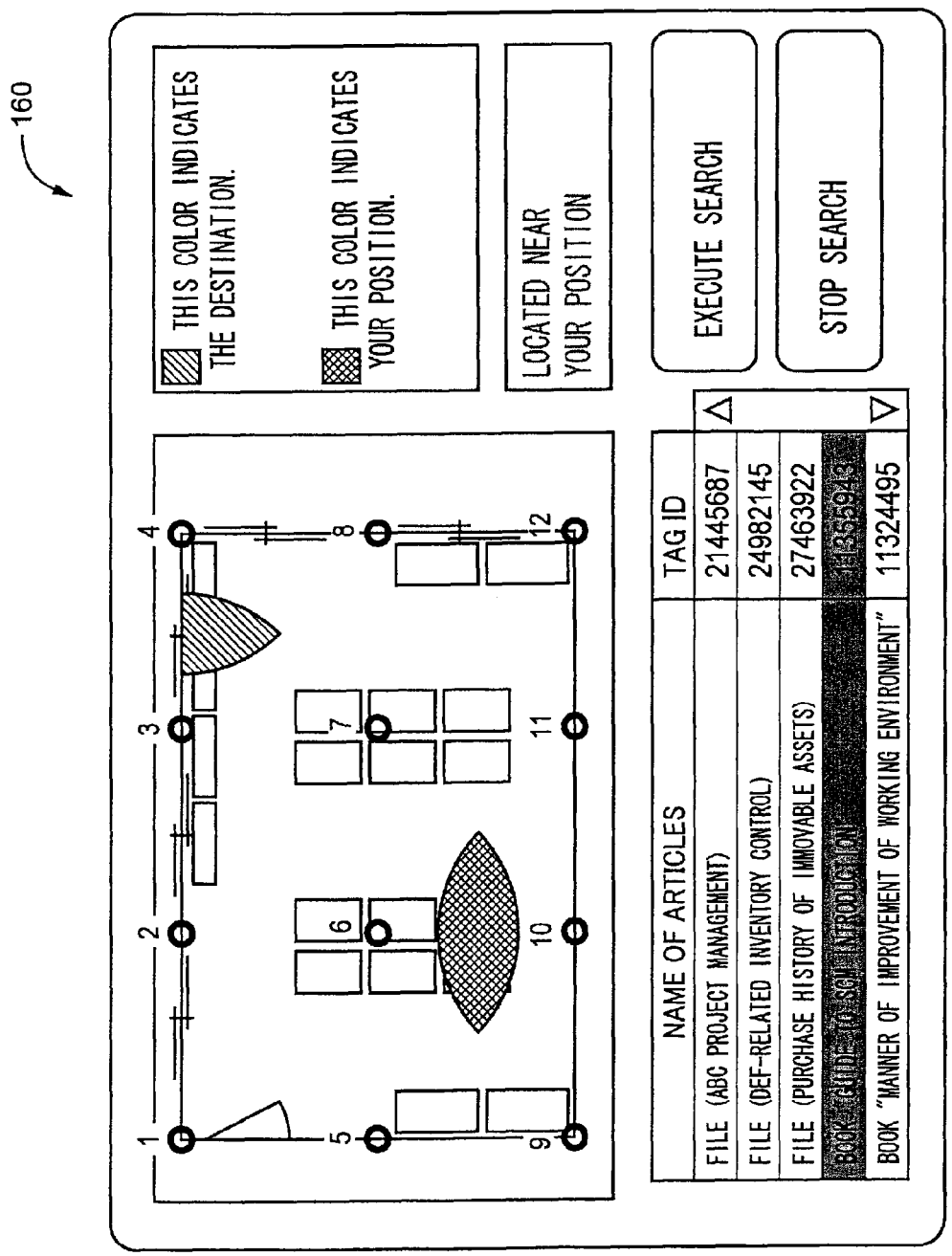
FIG. 23 is a view showing a tag search view displayed on a display portion of the portable radio-frequency tag communication device of FIG. 18.

FIG. 23 is the view showing a tag search view displayed on the display portion 160 of the portable radio-frequency tag communication device 114. The controller 152 stores: map information of the chamber 234; information relating to the number and grouping of the plurality of stationary radio-frequency tag communication devices 112; and information relating to the identification tag 14 provided on the portable radio-frequency tag communication device 114. The controller 152 controls the image processing portion 210 of the portable radio-frequency tag communication device 114, to provide the tag search view on the display portion 160, as shown in FIG. 23. The portable radio-frequency tag communication device 114 can designate a desired one of the plurality of radio-frequency tags 14, through the operating portion 162. Information entered through the operating portion 162 is transmitted to the controller 152, to initiate the operation to detect the designated radio-frequency tag 14. The display portion 160 functions as a display portion operable to indicate the direction in which the designated radio-frequency tag 14 is located, while the operating portion 162 functions as an input portion operable to manually designate the radio-frequency tag 14 desired to be detected.

To detect the desired radio-frequency tag 14, the plurality of stationary radio-frequency tag communication devices 112 obtains approximate positions of the designated radio-frequency tag 14 and the identification tag 14' provided on the portable radio-frequency tag communication device 114, and provides the controller 152 with information indicative of the obtained approximate positions. The controller 152 which has received the information commands the portable radio-frequency tag communication device 114 to display a map of the chamber 234, and information relating to the relative positions of the designated radio-frequency tag 14 and the portable radio-frequency tag communication device 114, as the tag search view, through the control of the image processing portion 210. The user carrying the portable radio-frequency tag communication device 114 is prompted by the displayed tag search view, to move to a position near the designated radio-frequency tag 14. When it is determined that the portable radio-frequency tag communication device 114 has been moved to a position near the designated radio-frequency tag 14, that is, if an affirmative determination is obtained by the judging portion 248, the controller 152 commands the sound generating portion 164 of the portable radio-frequency tag communication device 114 to provide a sound informing the user that the designated radio-frequency tag 14 is located near the user. The sound generating portion 164 functions as an indicator portion operable to provide a predetermined indication when the affirmative determination is obtained by the judging portion 248. The display portion 160, which displays the tag search view indicating that the designated radio-frequency tag 24 is located near the user, functions as an indicator portion operable to provide a visual indication that the designated radio-frequency tag 14 is located near the user.

Figure 24:
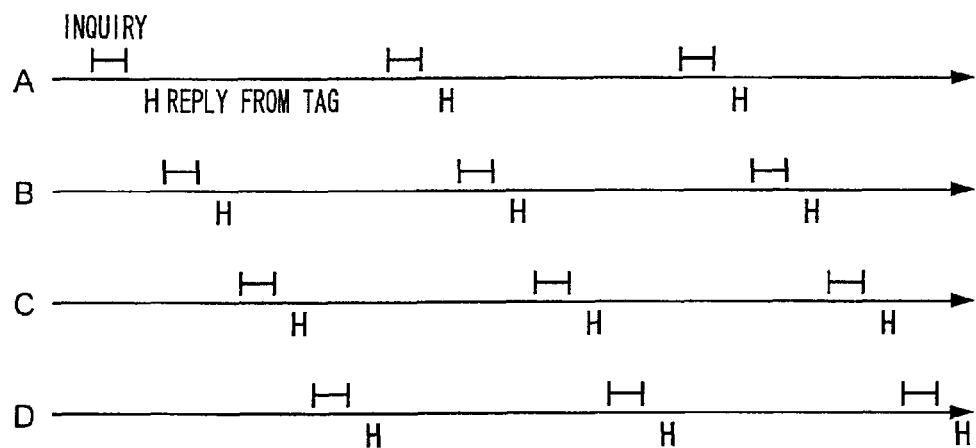
FIG. 24 is a view for explaining the timing of transmission of signals from the plurality of stationary radio-frequency tag communication devices each constructed as shown in FIG. 15.

FIG. 24 is the view for explaining the timing of transmission of transmitted signals from the plurality of stationary radio-frequency tag communication devices 112. The transmission control portion 246 controls the transmission of the transmitted signals from the plurality of stationary radio-frequency tag communication devices 112, so as to prevent overlapping of the areas of communication of those communication devices 112. Described in detail, the transmission control portion 246 controls the stationary radio-frequency tag communication devices 112 to transmit the interrogating waves $F_c$, such that the interrogating waves $F_c$ are transmitted at a timing indicated by a time slot A shown in FIG. 24, from the stationary radio-frequency tag communication devices 112a, 112c, 112i and 112k belonging to a group A, at a timing indicated by a time slot B from the stationary radio-frequency tag communication devices 112b, 112d, 112j and 112l belonging to a group B, at a timing indicated by a time slot C from the stationary radio-frequency tag communication devices 112e and 112g belonging to a group C, and at a timing indicated by a time slot D from the stationary radio-frequency tag communication devices 112f and 112h. By controlling the timings of transmission of the interrogating waves $F_c$ as described above, it is possible to effectively prevent an interference between the interrogating waves $F_c$ transmitted from the adjacent stationary radio-frequency tag communication devices 112, so that inquiry commands in the form of the interrogating waves can be efficiently transmitted without such an interference. The plurality of radio-frequency tag communication devices 112 are required to transmit the transmitted signals toward the designated radio-frequency tag 14, and toward the identification tag 14' provided on the portable radio-frequency tag communication device 114, at different times, by changing the inquiry commands to designate the respective IDs of the tags 14 and 14', so that the transmission of the interrogating waves as shown in FIG. 14 must be implemented twice.

Figure 25:
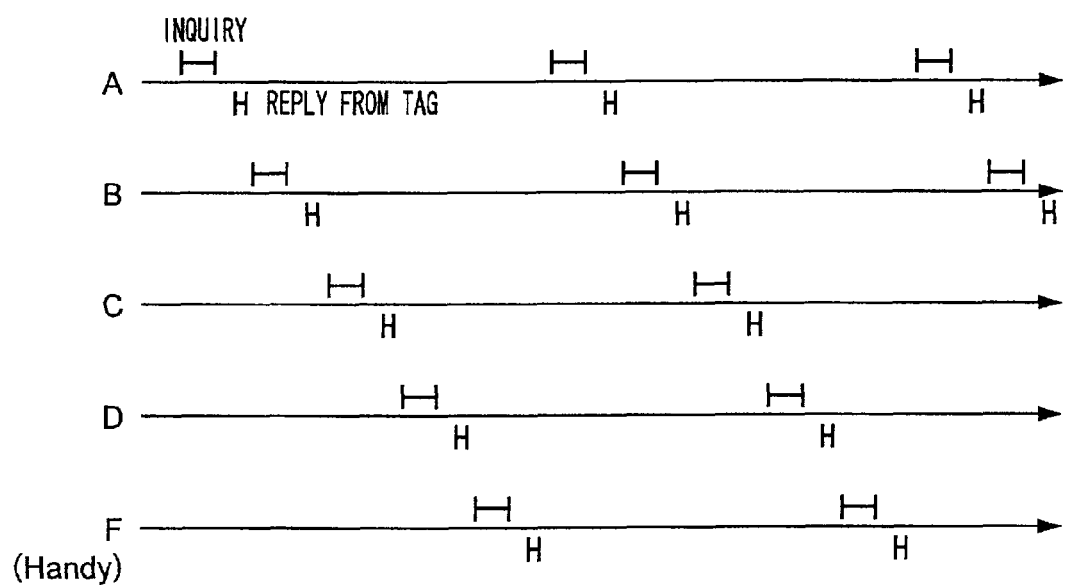
FIG. 25 is a view for explaining the timing of transmission of signals from the plurality of stationary radio-frequency tag communication deices of FIG. 15 and from the portable radio-frequency tag communication device of FIG. 18.

FIG. 25 is the view for explaining the timing of transmission of the transmitted signals from the plurality of stationary radio-frequency tag communication deices 112 and from the portable radio-frequency tag communication device 114. The judging portion 248, the transmission control portion 246 commands the portable radio-frequency tag communication device 114 to transmit the transmitted signal only after the affirmative determination is obtained by the judging portion 248, that is, only after it is determined that the identification tag 14' provided on the portable radio-frequency tag communication device 114 and the desired radio-frequency tag 14 are located within one of the areas of communication of the plurality of stationary radio-frequency tag communication devices 112. Namely, the transmitted signal is transmitted from the portable radio-frequency tag communication device 114 only after the portable radio-frequency tag communication device 114 has been located near the designated radio-frequency tag 14. The transmission control portion 246 controls the transmission of the transmitted signals from the stationary radio-frequency tag communication devices 112 and the portable radio-frequency tag communication device 114 at different timings. Described in detail, the interrogating waves $F_c$ are transmitted from the plurality of stationary radio-frequency tag communication devices 112 at the respective different timings as described above, and the interrogating wave $F_p$ is transmitted from the portable radio-frequency tag communication device 114 at a timing indicated by a time slot E shown in FIG. 25. By controlling the timing of transmission of the transmitted signals in a coordinated fashion as described above, the radio-frequency tag 14 located within one of the areas of communication can be detected without an interference between the transmitted waves.

Figure 26:
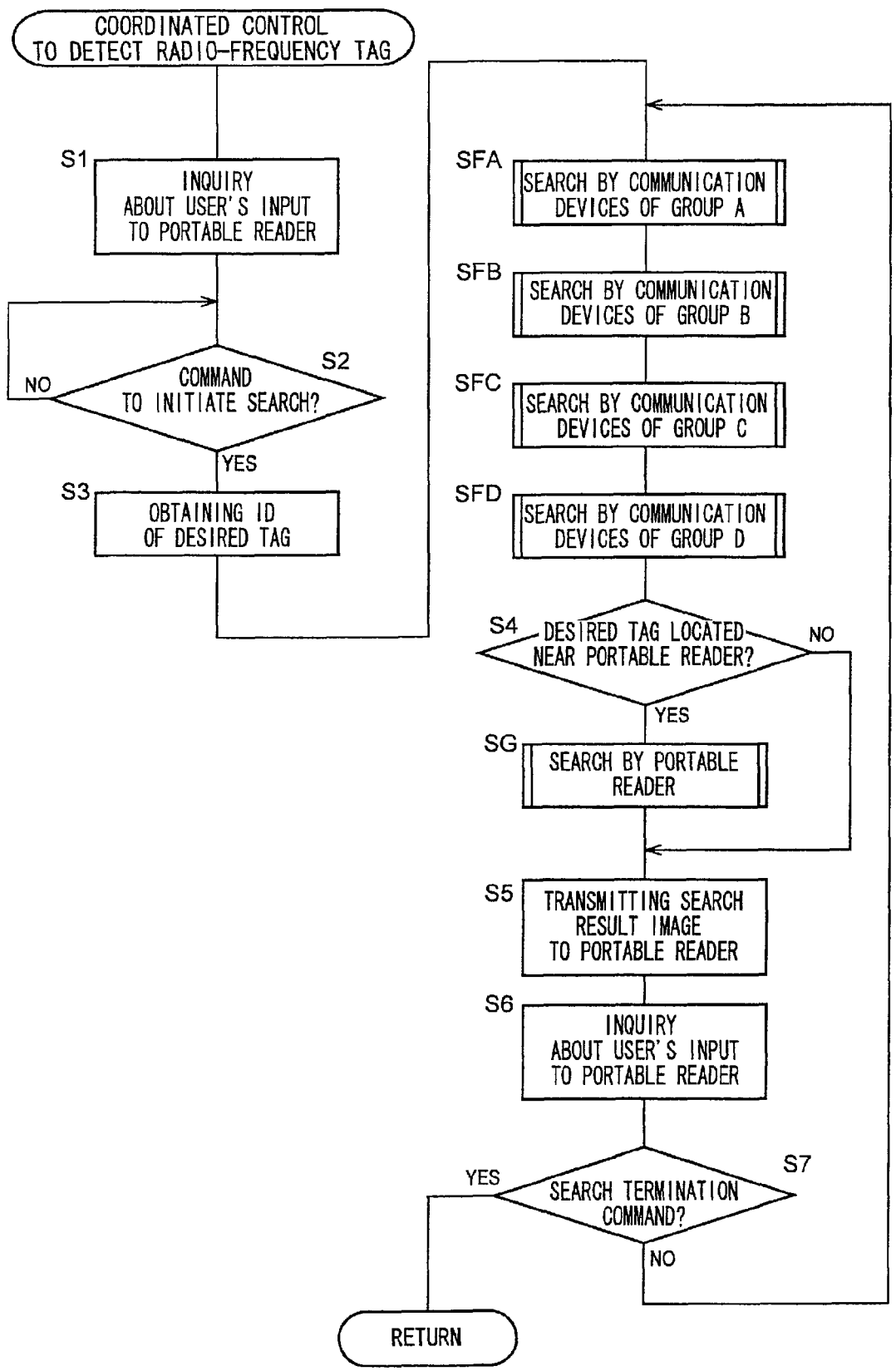
FIG. 26 is a flow chart illustrating a coordinated control operation of a CPU of the controller of FIG. 22, to detect the radio-frequency tag.

FIG. 26 is the flow chart illustrating a coordinated control operation of the CPU 238 of the controller 152, to detect the radio-frequency tag. The control routine of FIG. 26 is repeatedly executed with a predetermined cycle time.

The control routine is initiated with step S1 ("step" being hereinafter omitted) to make an inquiry about a user's input to the portable radio-frequency tag communication device 114 (portable reader). Then, S2 is implemented to determine whether the user's input is a command requesting initiation of an operation to detect the radio-frequency tag 14. The determination in S2 is repeated as long as a negative determination is obtained in S2. If an affirmative determination is obtained in S2, the control flow goes to S3 to obtain the ID of the radio-frequency tag 14 to be detected (desired tag 14), which has been input through the operating portion 162 of the portable radio-frequency tag communication device 114. Then, the control flow goes to SFX illustrated in FIG. 27, wherein an approximate position search of the desired radio-frequency tag 14 is made by the stationary radio-frequency tag communication devices 112 of a group X. That is, SFA is first implemented to make the search by the stationary radio-frequency tag communication devices 112a, 112c, 112i and 112k of the group A. Then, SFB is implemented to make the search by the stationary radio-frequency tag communication devices 112b, 112d, 112j and 112l of the group B. SFC is then implemented to make the search by the stationary radio-frequency tag communication devices 112e and 112g of the group C, and SFD is then implemented to make the search by the stationary radio-frequency tag communication devices 112f and 112h of the group D. Then, the control flow goes to S4 to determine whether the portable radio-frequency tag communication device 114 is located near the desired radio-frequency tag 14, that is, whether the identification tag 14' provided on the portable radio-frequency tag communication device 114 and the desired radio-frequency tag 14 are located in one of the areas of communications of the plurality of stationary radio-frequency tag communication devices 112. If an affirmative determination is obtained in S4, the control flow goes to SG illustrated in FIG. 28, to activate the sound generating device 164 of the portable radio-frequency tag communication device 114 to generate a suitable sound informing the user that the desired radio-frequency tag 14 is located near the user, and to command the portable radio-frequency tag communication device 114 to perform an operation to detect the desired radio-frequency tag 14. The control flow then goes to S5 and the subsequent steps. If a negative determination is obtained in S4, the control flow goes from S4 to S5 in which a result of the operation to detect the desired radio-frequency tag 14 is displayed on the display portion 160 through the image processing portion 210. S6 is then implemented to make an inquiry about a user's input to the portable radio-frequency tag communication device 114. Then, SC7 is implemented to determine whether a command to terminate the detection of the radio-frequency tag 14 is present. If a negative determination is obtained in S7, the control flow goes back to SFA and the subsequent steps. If an affirmative determination is obtained in S7, the present control routine is terminated. In this control routine, the steps SFX and SG correspond to an operation of the transmission control portion 246.

Figure 27:
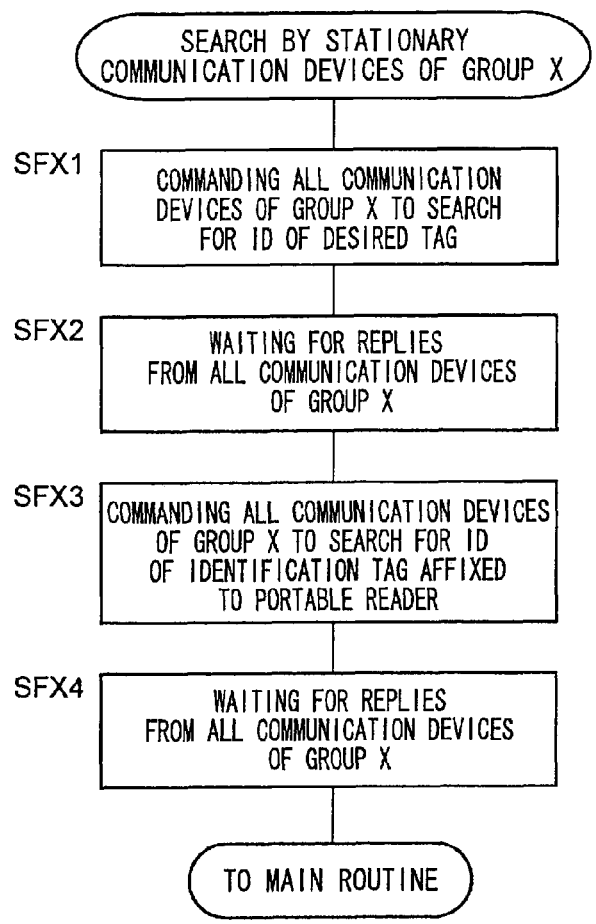
FIG. 27 is a flow chart illustrating a portion of the control operation of FIG. 26, for signal transmission from the stationary radio-frequency tag communication devices.

The control operation illustrated in FIG. 27 is initiated with SFX1 (the name of each of the groups A, B, C and D being inserted as "X", this insertion applying to the subsequent steps) to command all of the stationary radio-frequency tag communication devices of the group X to detect the position of the desired radio-frequency tag 14. Then, SFX2 is implemented to wait for replies from all of the stationary radio-frequency tag communication devices 112. Then, SFX3 is implemented to command all of the stationary radio-frequency tag communication devices 112 of the group X to detect the position of the identified tag 14' provided on the portable radio-frequency tag communication device 114. SFX4 is then implemented to wait for replies from all of the stationary radio-frequency tag communication devices 112. The control flow then goes to S4 and the subsequent steps of the main routine.

Figure 28:
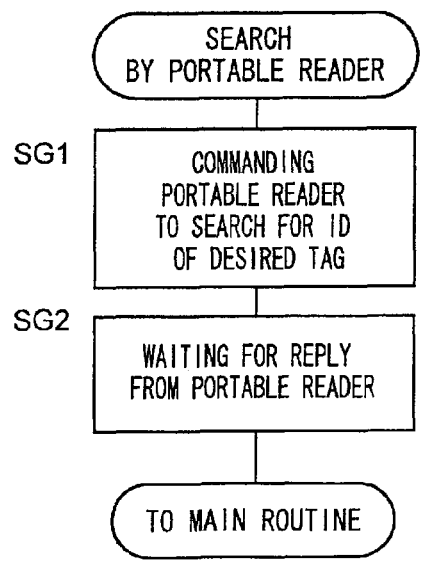
FIG. 28 is a flow chart illustrating a portion of the control operation of FIG. 26, for signal transmission from the portable radio-frequency tag communication device.

The control operation illustrated in FIG. 28 is initiated with SG1 to command the portable radio-frequency tag communication device 114 to detect the position of the desired radio-frequency tag 14. Then, SG2 is implemented to wait for a reply from the portable radio-frequency tag communication device 114. The control flow then goes to S5 and the subsequent steps of the main routine.

Figure 29:
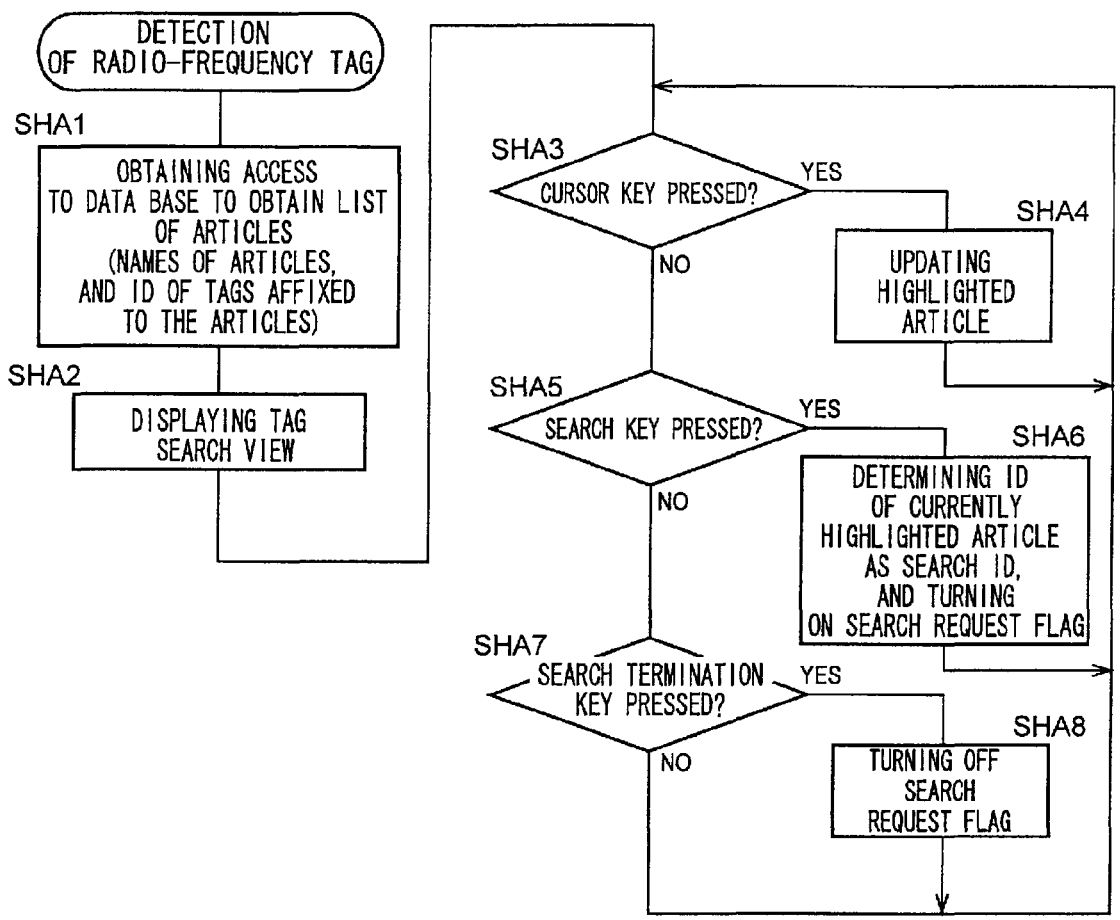
FIG. 29 is a flow chart illustrating a control operation of a control portion of the portable radio-frequency tag communication device of FIG. 18, for detecting the desired radio-frequency tag.

FIG. 29 is the flow chart illustrating a control operation of the control portion 206 of the portable radio-frequency tag communication device 114. The control routine of FIG. 29 is repeatedly executed with a predetermined cycle time.

The control routine of FIG. 29 is initiated with SHA1 to obtain access to a suitable data base to obtain a list of articles (a list of the names of the articles, and Ids of the radio-frequency tags 14 affixed to the articles) corresponding to the radio-frequency tags 14. Then, SHA2 is implemented to activate the display portion 160 to display the tag search view as shown in FIG. 23. SHA3 is then implemented to determine whether a cursor key on the operating portion 162 has been pressed. If an affirmative decision is obtained in SHA3, the control flow goes to SHA4 to update the article highlighted on the display portion 160, and goes back to SHA3. If a negative determination is obtained in SHA3, the control flow goes to SHA5 to determine whether a search key on the operating portion 162 has been pressed. If an affirmative determination is obtained in SHA5, the control flow goes to SHA6 to determine the ID indicated on the display portion 162, as the ID of the desired radio-frequency tag 14, and to turn on a search request flag, and goes back to SHA3 and the subsequent steps. If a negative determination is obtained in SHA5, the control flow goes to SHA7 to determine whether a search end key on the operating portion 162 has been pressed. If an affirmative determination is obtained in SHA7, the control flow goes to SHA8 to turn off the search request flag, and goes back to SHA3 and the subsequent steps. If a negative determination is obtained in SHA7, the control flow goes back to SHA3 and the subsequent steps. In the control routine described above, SHA2, SHA4, SHA6 and SHA8 corresponds to an operation of the display portion 160, while SHA3, SHA5 and SHA7 correspond to an operation of the operating portion 162.

Figure 30:
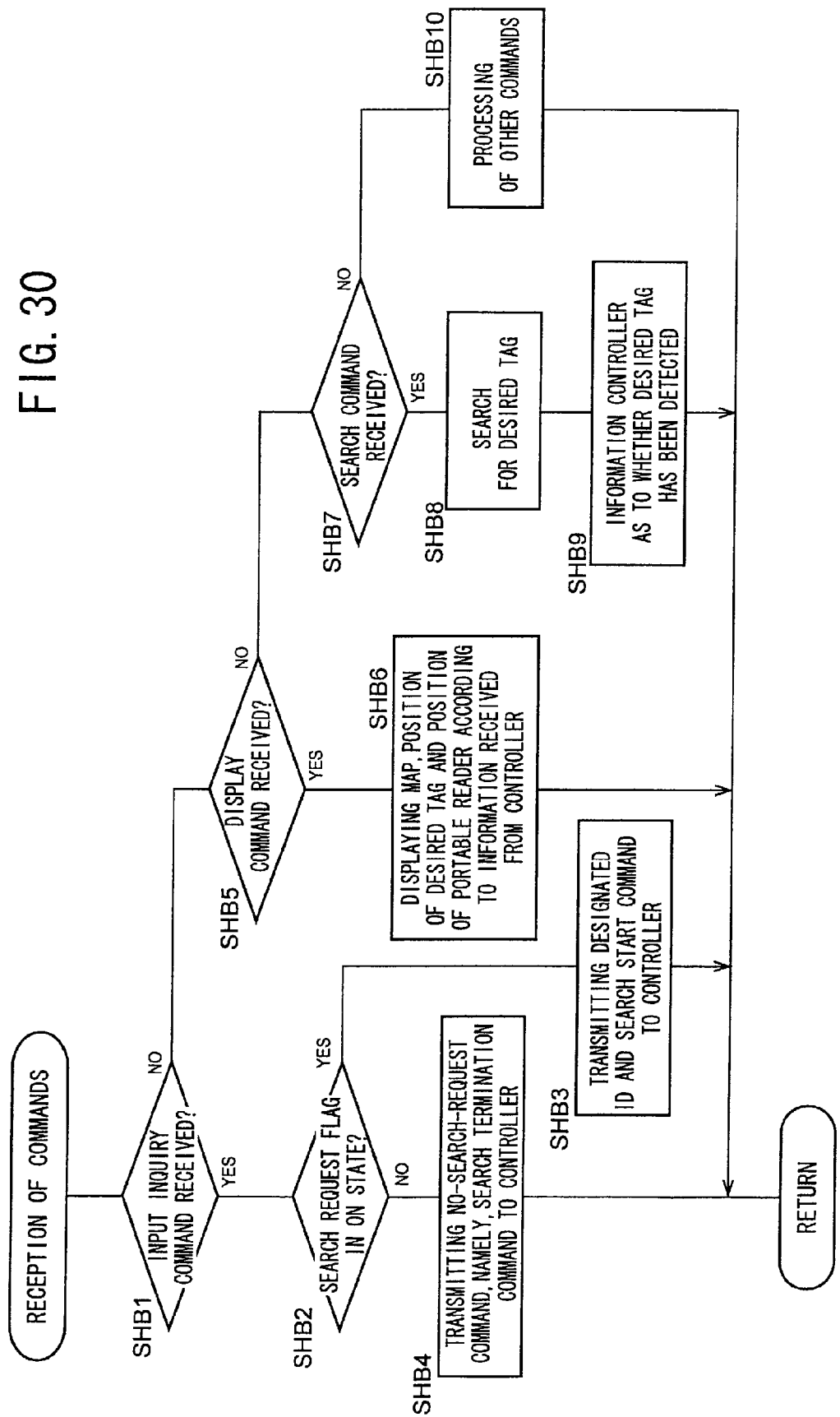
FIG. 30 is a flow chart illustrating a control operation of the control portion of the portable radio-frequency tag communication device of FIG. 18, to receive commands from a controller.

FIG. 30 is the flow chart illustrating a command reception control executed by the control portion 206 of the portable radio-frequency tag communication device 114, to receive commands from the controller 152. The control routine of FIG. 30 is repeatedly executed with a predetermined cycle time.

The control routine of FIG. 30 is initiated with SHB1 to determine whether the input inquiry command has been received from the controller 152. If a negative determination is obtained in SHB1, the control flow goes to SHB5 to determine whether a display command has been received from the controller 152. If an affirmative determination is obtained in SHB1, the control flow goes to SHB2 to determine whether the search request flag is in the on state. If an affirmative determination is obtained in SHB2, the control flow goes to SHB3 to transmit the ID of the desired radio-frequency tag 14 and a search start command to the controller 152, and the present control routine is terminated. If a negative determination is obtained in SHB2, the control flow goes to SHB4 to transmit a non-search-request command, namely, a search termination command, and the present control routine is terminated. If an affirmative determination is obtained in SHB5, that is, if the display command has been received from the controller 152, the control flow goes to SHB6 to activate the display portion 160 according to the information received from the controller 152, to provide the tag search view including the position of the desired radio-frequency tag 14 and the position of the portable radio-frequency tag communication device 114, and the present control routine is terminated. If a negative determination is obtained in SHB5, that is, if the display command has not been received from the controller 152, the control flow goes to SHB7 to determine whether a search command has been received from the controller 152. If an affirmative determination is obtained in SHB7, the control flow goes to SHB8 to detect the position of the desired radio-frequency tag 14, and to SHB9 to transmit a result of the search made in SHB8, to the controller 152, and the present control routine is terminated. If a negative determination is obtained in SHB7, the control flow goes to SHB10 to implement an operation to process other commands, and the present control routine terminated.

In the present embodiment described above, the radio-frequency tag detecting system comprises the transmission control portion 246 (steps SFX and SG) operable to control transmission of the transmitted signals such that the plurality of stationary radio-frequency tag communication devices (112) and the portable radio-frequency tag communication device (114) transmit the transmitted signals at respective different timings. This time sharing transmission of the transmitted signals makes it possible to prevent an interference between the transmitted waves transmitted from the plurality of stationary radio-frequency tag communication devices (112) and the transmitted signal transmitted from the portable radio-frequency tag communication device (114). Namely, the present radio-frequency tag detecting system 110 permits adequate detection of the radio-frequency tag 14 located at a predetermined position, while effectively preventing the interference between the transmitted waves transmitted from the plurality of stationary radio-frequency tag communication devices (112) and the transmitted wave transmitted from the portable radio-frequency tag communication device (114). For example, the radio-frequency tag 14 is affixed to each of a large number of articles located within a comparatively large area such as an area within an office or library. The large number of articles can be administered by detecting the positions of the corresponding radio-frequency tags 14.

Further, the area of communication of the portable radio-frequency tag communication device is made narrower than the areas of communication of said plurality of stationary radio-frequency tag communication devices, so that desired radio-frequency tag 14 can be efficiently detected by first obtaining an approximate position of the desired radio-frequency tag 14 by the plurality of stationary radio-frequency tag communication devices 112, and then obtaining an accurate position of the desired radio-frequency tag 14 by the portable radio-frequency tag communication device 114.

Further, the transmission control portion 246 controls the timings of transmission of the transmitted signals from the plurality of stationary radio-frequency tag communication devices 112, so as to prevent concurrent transmission of the transmitted signals toward an area in which the areas of transmission of the plurality of radio-frequency tag communication devices 112 overlap each other. This arrangement effectively prevents an interference between the transmitted waves transmitted form the plurality of stationary radio-frequency tag communication devices 112.

Further, the portable radio-frequency tag communication device 114 is provided with an identification tag, which makes it possible to detect the position of the portable radio-frequency tag communication device 114 by the plurality of stationary radio-frequency tag communication devices 112.

Further, the radio-frequency tag detecting system comprises the judging portion 248 (step S4) operable to determine whether the identification tag 14' provided on the portable radio-frequency tag communication device 114 and the radio-frequency tag 14 to be detected are located within one of the areas of communication of the plurality of stationary radio-frequency tag communication devices 112. This arrangement permits detection of a relative position between the portable radio-frequency tag communication device 114 and the radio-frequency tag 14 to be detected.

Further, the transmission control portion 246 controls the transmission of the transmitted signal from the portable radio-frequency tag communication device 114 such that the transmitted signal is transmitted only after an affirmative determination is obtained by the judging portion 248. Accordingly, the desired radio-frequency tag 14 can be efficiently detected by first operating the plurality of radio-frequency tag communication devices 112 to obtain an approximate position of the desired radio-frequency tag 14, and then operating the portable radio-frequency tag communication device 114 to obtain an accurate position of the desired radio-frequency tag 14.

Further, the portable radio-frequency tag communication device 114 includes the input portion 162 (steps SHA3, SHA5 and SHA7) for manually designating the radio-frequency tag 14 to be detected. Accordingly, the user is required to operate only the portable radio-frequency tag communication device 114, to accurately detect the desired radio-frequency tag 14 located within the predetermined area.

Further, the portable radio-frequency tag communication device 114 includes the display portion 160 (steps SHA2, SHA4, SHA6 and SHA8) operable to indicate a direction in which the radio-frequency tag 14 to be detected is located. The display portion 160 permits visual detection of the position of the desired radio-frequency tag 14.

Further, the portable radio-frequency tag communication device 114 includes the sound generating device functioning as an indicator device 164 (step SG) operable to provide a predetermined indication when an affirmative determination is obtained by the judging portion 246. This indication enables the user to confirm that the radio-frequency tag 14 to be detected is located near the portable radio-frequency tag communication device 114.

Further, the portable radio-frequency tag communication device 114 includes the plurality of antenna elements 176, and the directivity control portion 186 operable to control directivity of the plurality of antenna elements. The directivity control portion 186 permits effective and accurate detection of the position of the desired radio-frequency tag 14.

While the preferred embodiments of this invention have been described above in detail by reference to the drawings, it is to be understood that the invention is not limited to these preferred embodiments, but may be otherwise embodied.

Although the preceding embodiment described above uses a single portable radio-frequency tag communication device 114 for detecting the desired radio-frequency tag 14, the present embodiment is not limited to this embodiment. For instance, a plurality of portable radio-frequency tag communication devices 114 may be provided to detect the radio-frequency tag 14. In this case, a plurality of users of the system can more adequately detect the plurality of radio-frequency tags 14 within a predetermined area.

Figure 31:
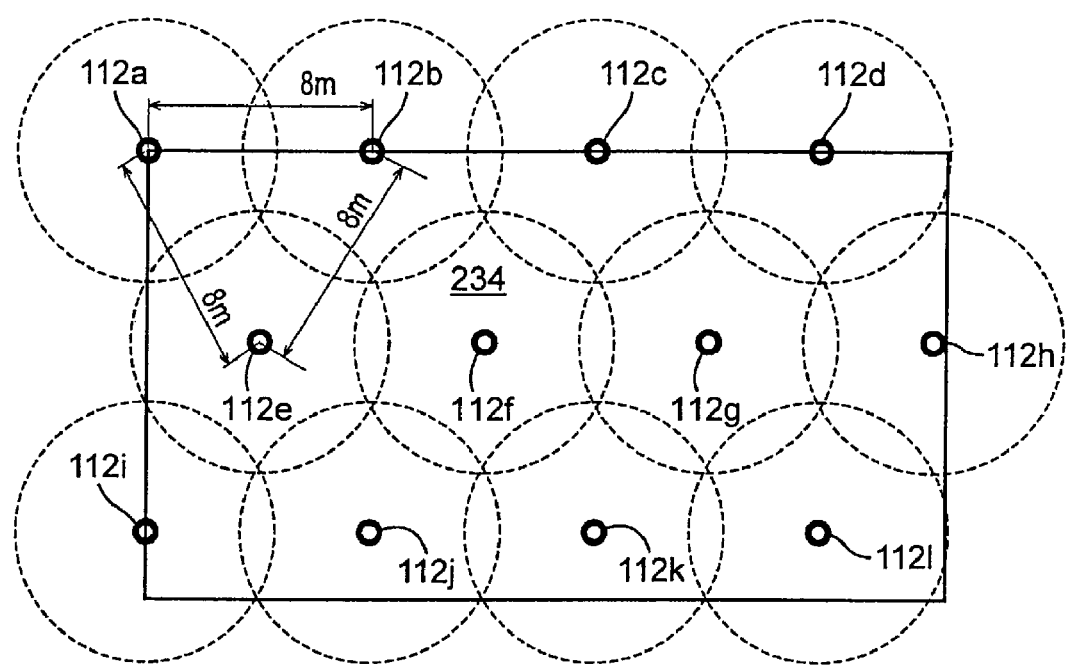
FIG. 31 is a view showing the plurality of stationary radio-frequency tag communication devices each of which is constructed as shown in FIG. 15 and which are arranged in a chamber in a pattern different from that of FIG. 19.

In the preceding embodiment, the plurality of stationary portable radio-frequency tag communication devices 112 are arranged in the 3×4 matrix within the chamber 234, as shown in FIG. 19. However, the stationary portable radio-frequency tag communication devices 112 may be arranged otherwise, for instance, in a pattern as shown in FIG. 31 such that the adjacent portable radio-frequency tag communication devices 112 are located at positions which define a triangle as seen in a plan view. This arrangement not only permits an increased overall area of communication provided by the same number of the stationary radio-frequency tag communication devices, but also makes it possible to prevent an interference between the transmitted waves, by transmitting the transmitted waves at three different timings (four different timings including the timing of transmission from the portable radio-frequency tag communication device 114).

While the preceding embodiment is arranged such that the controller 152 is provided separately from the stationary radio-frequency tag communication devices 112, any one of the stationary radio-frequency tag communication devices 112 may be arranged to perform the function of the controller 152. Alternatively, the portable radio-frequency tag communication device 114 may be arranged to perform the function of the controller 152.

In the portable radio-frequency tag communication device 114 in the preceding embodiment, the operating portion 162 is provided separately from the display portion 160. However, the portable radio-frequency tag communication device 114 may be provided with a touch type display through which the desired radio-frequency tag can be designated by a touching operation and which indicates a direction in which the desired radio-frequency tag 14 is located.

In the preceding embodiment, the sound generating device 164 of the portable radio-frequency tag communication device 114 is arranged to provide a predetermined sound when the portable radio-frequency tag communication device 114 is located near the desired radio-frequency tag 14. However, the sound generating device 164 may be arranged to provide a suitable sound informing that the portable radio-frequency tag communication device 114 is moved away from the desired radio-frequency tag 14 by a large distance.

While the description of the preceding embodiment is silent on the position at which there is stored the data base representative of a list of articles to which the radio-frequency tags 14 are affixed for administration of the articles, the data base may be stored in the portable radio-frequency tag communication device 114, for example.

It is to be understood that the present invention may be embodied with various other changes which may occur to those skilled in the art, without departing from the spirit and scope of this invention.

What is claimed is:

1. A radio-frequency tag communication device arranged to transmit a transmitted signal toward a radio-frequency tag, and to receive a reply signal transmitted from the radio-frequency tag in response to the transmitted signal, for communication with the radio-frequency tag, said radio-frequency tag communication device comprising:
    a transmission control portion operable to control transmission of said transmitted signal, so as to prevent overlapping of an area of communication of said radio-frequency tag communication device and an area of transmission of another radio-frequency tag communication device; and
    a radio-frequency-tag communication judging portion operable to determine whether there is any radio-frequency tag which exists within said area of communication of said radio-frequency tag communication device and which is under communication with said another radio-frequency tag communication device, and wherein said transmission control portion restricts the transmission of the transmitted signal when an affirmative determination is obtained by said radio-frequency-tag communication judging portion.

2. The radio-frequency tag communication device according to claim 1, wherein said transmission control portion controls the transmission of said transmitted signal such that the transmitted signal is transmitted at a timing different from a timing of transmission of the transmitted signal from said another radio-frequency tag communication device.

3. The radio-frequency tag communication device according to claim 1, further comprising a plurality of antenna elements through which the transmitted signal is transmitted, and said transmission control portion controls a direction of transmission of the transmitted signal by controlling a phase of the transmitted signal to be transmitted through each of said plurality of antenna elements, to thereby change said area of communication.

4. The radio-frequency tag communication device according to claim 1, wherein said transmission control portion controls the direction of transmission of the transmitted signal to change the area of transmission of said radio-frequency tag communication device when the affirmative determination is obtained by said radio-frequency-tag communication judging portion.

5. The radio-frequency tag communication device according to claim 1, further comprising a plurality of antenna elements through which said reply signals are received from said radio-frequency tags, and a reception control portion operable to control a direction of reception of the reply signals by controlling a phase of each of the reply signals received through said plurality of antenna elements.

6. The radio-frequency tag communication device according to claim 5, wherein said reception control portion is operable to control an amplitude of each of the transmitted signals to be transmitted from said plurality of antenna elements, and said reception control portion is operable to control an amplitude of each of the reply signals received through said plurality of antenna elements.

7. The radio-frequency tag communication device according to claim 5, wherein said area of communication of said radio-frequency tag communication device which is used for the determination by said radio-frequency-tag communication judging portion is determined on the basis of said direction of reception of said reply signals which is controlled by said reception control portion.

8. The radio-frequency tag communication device according to claim 5, wherein said transmission control portion controls the phase of each of the transmitted signals to be transmitted through said plurality of antenna elements such that the direction of transmission of the transmitted signals is coincident with the direction of reception of the reply signals.

9. The radio-frequency tag communication device according to claim 5, wherein said reception control portion controls the phase of each of the reply signals received by said plurality of antenna elements such that the direction of reception of the rely signals is coincident with the direction of transmission of the transmitted signals.

10. The radio-frequency tag communication device according to claim 1, further comprising a radio-frequency-tag-position detecting portion operable to detect a position of the radio-frequency tag existing within said area of communication of said radio-frequency tag communication device.

11. A radio-frequency tag communication system comprising a plurality of radio-frequency tag communication devices each constructed as defined in claim 1, and wherein said transmission control portions of the plurality of radio-frequency tag communication devices of said plurality of radio-frequency tag communication devices transmit the transmitted signals in synchronization with each other, so as to prevent overlapping areas of communication of said plurality of radio-frequency tag communication devices.

12. The radio-frequency tag communication system according to claim 11, wherein said transmission control portions of said plurality of radio-frequency tag communication devices control the transmission of said transmitted signals in synchronization with each other, such that the transmitted signals are transmitted by said radio-frequency tag communication devices at respective different timings.

13. The radio-frequency tag communication system according to claim 11, wherein said transmission control portions of said plurality of radio-frequency tag communication devices control directions of transmissions of said transmitted signals, in synchronization with each other.

14. A radio-frequency tag detecting system comprising:
    a plurality of stationary radio-frequency tag communication devices which are located at respective predetermined positions and which are arranged to transmit transmitted signals toward a predetermined radio-frequency tag and to receive a reply signal transmitted from the radio-frequency tag, for communication with the radio-frequency tag;

a portable radio-frequency tag communication device, which is provided with an identification tag which has the same arrangement as the radio-frequency tag and is arranged to transmit a further transmitted signal toward said radio-frequency tag and to receive a further reply signal transmitted from the radio-frequency tag, for detecting the radio-frequency tag located within areas of communication of said plurality of stationary radio-frequency tag communication devices;

a transmission control portion operable to control transmission of said transmitted signals such that said plurality of stationary radio-frequency tag communication devices and said portable radio-frequency tag communication device transmit said transmitted signals at respective different timings; and a judging portion operable to determine whether said identification tag provided on said portable radio-frequency tag communication device and the radio-frequency tag to be detected are located within one of the areas of communication of the plurality of stationary radio-frequency tag communication devices;

wherein said transmission control portion controls the transmission of the transmitted signal from said portable radio-frequency tag communication device such that the transmitted signal is transmitted only after an affirmative determination is obtained by said judging portion.

15. The radio-frequency tag detecting system according to claim 14, wherein the area of communication of said portable radio-frequency tag communication device is narrower than the areas of communication of said plurality of stationary radio-frequency tag communication devices.

16. The radio-frequency tag detecting system according to claim 14, wherein said transmission control portion controls the timings of transmission of the transmitted signals from said plurality of stationary radio-frequency tag communication devices, so as to prevent concurrent transmission of the transmitted signals toward an area in which the areas of transmission of the plurality of radio-frequency tag communication devices overlap each other.

17. The radio-frequency tag detecting system according to claim 14, which comprises a plurality of portable radio-frequency tag communication devices each arranged as defined in claim 14.

18. The radio-frequency tag detecting system according to claim 14, wherein said portable radio-frequency tag communication device includes an input portion for manually designating the radio-frequency tag to be detected.

19. The radio-frequency tag detecting system according to claim 14, wherein said portable radio-frequency tag communication device includes a display portion operable to indicate a direction in which the radio-frequency tag to be detected is located.

20. The radio-frequency tag detecting system according to claim 14, wherein said portable radio-frequency tag communication device includes an indicator portion operable to provide a predetermined indication when an affirmative determination is obtained by said judging portion.

21. The radio-frequency tag detecting system according to claim 14, wherein said portable radio-frequency tag communication device includes a plurality of antenna elements, and a directivity control portion operable to control directivity of said plurality of antenna elements.

* * * * *